US012488027B2

(12) United States Patent
Fayyaz et al.

(10) Patent No.: US 12,488,027 B2
(45) Date of Patent: Dec. 2, 2025

(54) USING FIXED-WEIGHT LANGUAGE MODELS TO CREATE AND INTERACT WITH A RETRIEVAL INDEX

(71) Applicant: Microsoft Technology Licensing, LLC, Redmond, WA (US)

(72) Inventors: Mohsen Fayyaz, Berlin (DE); Eric Chris Wolfgang Sommerlade, Oxford (GB); Justin James Wagle, Pacifica, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 18/137,944

(22) Filed: Apr. 21, 2023

(65) Prior Publication Data
US 2024/0354317 A1 Oct. 24, 2024

(51) Int. Cl.
*G06F 16/31* (2019.01)
*G06F 16/334* (2025.01)

(52) U.S. Cl.
CPC ........ *G06F 16/313* (2019.01); *G06F 16/3344* (2019.01); *G06F 16/3347* (2019.01)

(58) Field of Classification Search
None
See application file for complete search history.

(56) References Cited

U.S. PATENT DOCUMENTS

| 2007/0179962 | A1* | 8/2007 | Hernandez-Sherrington ............. G06F 40/117 |
| 2022/0358398 | A1* | 11/2022 | Meng .................... G06F 16/951 |
| 2023/0119161 | A1* | 4/2023 | Yadaw .................... G06F 40/30 707/706 |
| 2024/0177818 | A1* | 5/2024 | Goravar ................ G16H 50/20 |

OTHER PUBLICATIONS

PCT Search Report and Written Opinion for PCT/US2024/023504, mailing date Jul. 15, 2024, 14 pages.
Wang, et al., "A Neural Corpus Indexer for Document Retrieval," arXiv, arXiv:2206.02743v1 [cs.IR], Jun. 6, 2022, 18 pages.
Dosovitskiy, et al., "An Image is Worth 16x16 Words: Transformers for Image Recognition at Scale," arXiv, Cornell University, arXiv:2010. 11929v2cs.CV], Jun. 3, 2021, 22 pages.

(Continued)

*Primary Examiner* — Taelor Kim

(57) ABSTRACT

A technique uses an encoder system to produce an index of target item embeddings. Each target item embedding is input-agnostic and universal in the sense that different expressions of a target concept, produced using different combinations of input modes, map to the same target item embedding in the index. The encoder system throttles the amount of computations it performs based on the assessed capabilities of an execution platform. A retrieval system processes a multimodal input query by first generating a candidate set of target item embeddings in the index that match the input query, and then using a filtering operation to identify those target item embeddings that are most likely to match the input query. The encoder system and the retrieval system rely on language-based components having weights that are held constant during a training operation. Other weights of these systems are updated during the training operation.

18 Claims, 10 Drawing Sheets

(56) References Cited

OTHER PUBLICATIONS

Radford, et al., "Learning Transferable Visual Models From Natural Language Supervision," arXiv, Cornell University, arXiv:2103.00020v1 [cs.CV], Feb. 26, 2021 48 pages.
Nichol, et al., "Glide: Towards Photorealistic Image Generation and Editing with Text-Guided Diffusion Models," arXiv, Cornell University, arXiv:2112.10741v3 [cs.CV], Mar. 8, 2022, 20 pages.
Saharia, et al., "Photorealistic Text-to-Image Diffusion Models with Deep Language Understanding," arXiv, Cornell University, arXiv:2205.11487v1 [cs.CV], May 23, 2022, 46 pages.
Ramesh, et al., "Hierarchical Text-Conditional Image Generation with Clip Latents," arXiv, Cornell University, arXiv:2204.06125v1 [cs.CV], Apr. 13, 2022, 27 pages.
Devlin, et al., "Bert: Pre-training of Deep Bidirectional Transformers for Language Understanding," arXiv, Cornell University, arXiv:1810.04805v2 [cs.CL], May 24, 2019, 16 pages.
Vaswani, et al., "Attention Is All You Need," arXiv, Cornell University, arXiv:1706.03762v5 [cs.CL], Dec. 6, 2017, 15 pages.
Brown, et al., "Language Models are Few-Shot Learners," arXiv, Cornell University, arXiv:2005.14165v4 [cs.CL], Jul. 22, 2020, 75 pages.
He, et al., "Deep Residual Learning for Image Recognition," arXiv, Cornell University, arXiv:1512.03385v1 [cs.CV], Dec. 10, 2015, 12 pages.
Tsimpoukelli, et al., "Multimodal Few-Shot Learning with Frozen Language Models," in 35th Conference on Neural Information Processing Systems (NeurIPS 2021) ,2021, 13 pages.
Yang, et al., "Unified Contrastive Learning in Image-Text-Label Space," Open Access version of paper in 2022 IEEE/CVF Conference on Computer Vision and Pattern Recognition (CVPR), Jun. 2022, 11 pages.
Yuan, et al., "Florence: A New Foundation Model for Computer Vision," arXiv, Cornell University, arXiv:2111.11432v1 [cs.CV], Nov. 22, 2021, 17 pages.
Selva, et al., "Video Transformers: A Survey," in arXiv:2201.05991v3 [cs.CV], Cornell University, Feb. 13, 2023, 26 pages.
Verma, et al., "Audio Transformers: Transformer Architectures for Large Scale Audio Understanding. Adieu Convolutions," arXiv, Cornell University, arXiv:2105.00335v1 [cs.SD], May 1, 2021, 5 pages.
Tan, et al., "A Survey on Neural Speech Synthesis," arXiv, Cornell University, arXiv:2106.15561v3 [eess.AS], Jul. 23, 2021, 63 pages.
Alam, et al., "Survey on Deep Neural Networks in Speech and Vision Systems," arXiv, Cornell University, arXiv:1908.07656v2 [cs.CV], 24 pages.
Pepino, et al., "Study of Positional Encoding Approaches for Audio Spectrogram Transformers," arXiv, Cornell University, arXiv:2110.06999v1 [cs.SD], Oct. 13, 2021, 5 pages.
Gong, et al., "AST: Audio Spectrogram Transformer," arXiv, Cornell University, arXiv:2104.01778v3 [cs.SD], Jul. 8, 2021, 5 pages.
"Introducing The World's Largest Open Multilingual Language Model: Bloom," available at https://bigscience.huggingface.co/blog/bloom, accessed on Feb. 13, 2023, 2 pages.
Scao, et al., "Bloom: A 176B-Parameter Open-Access Multilingual Language Model," arXiv, Cornell University, arXiv:2211.05100v2 [cs.CL], Dec. 11, 2022, 62.

\* cited by examiner

OVERVIEW OF OPERATION OF THE ENCODER SYSTEM, 902

RECEIVE AN INPUT ITEM, THE INPUT ITEM HAVING FIRST CONTENT PROVIDED BY A FIRST INPUT MODE AND SECOND CONTENT PROVIDED BY A SECOND INPUT MODE, THE SECOND INPUT MODE DIFFERING FROM THE FIRST INPUT MODE.
904

MAP, USING AN INPUT-EMBEDDING SYSTEM, THE FIRST CONTENT AND THE SECOND CONTENT TO AN INPUT-SYSTEM EMBEDDING.
906

MAP, USING A LANGUAGE-BASED EMBEDDING-MAPPING SYSTEM, THE INPUT-SYSTEM EMBEDDING TO A TARGET ITEM EMBEDDING THAT REPRESENTS THE INPUT ITEM.
908

STORE THE TARGET ITEM EMBEDDING IN THE INDEX.
910

FIG. 9

USING FIXED-WEIGHT LANGUAGE MODELS TO CREATE AND INTERACT WITH A RETRIEVAL INDEX

BACKGROUND

A vector-based retrieval system relies on an index that represents target items using respective target item embeddings. Each target item embedding corresponds to a distributed vector that expresses the meaning of the target item in a vector space. At query time, the retrieval system converts an input query into a query embedding. The retrieval system then finds the set of target item embeddings that are the closest match to the query embedding within the vector space. The retrieval system assesses closeness using any distance metric, such as cosine similarity. While the above-summarized type of retrieval system provides a flexible mechanism for performing a semantic-based search, it can also exhibit poor performance in various circumstances.

SUMMARY

A technique is described herein that uses an encoder system to produce an index of target item embeddings. The technique uses a retrieval system to match a query embedding against the target item embeddings in the index. In some implementations, the encoder system and the retrieval system rely on language-based components having weights that are held constant during a training operation. The encoder system and the retrieval system rely on other weights that are updated during the training operation.

According to another illustrative aspect, the encoder system processes input items expressed using any input mode or any combination of two or more input modes. Similarly, the retrieval system allows a user to express an input query using any input mode or combination of input modes. Illustrative input modes include a text input mode, an image input mode, an audio input mode, a video input mode, etc.

According to another illustrative aspect, the encoder system produces target item embeddings that are input-agnostic and universal. This means that plural expressions of the same target concept, generated using different input modes and combinations of input modes, map to the same target item embedding.

According to another illustrative aspect, the technique assesses the processing capability of an execution platform that runs the encoder system. The technique throttles an amount of processing operations to be performed by the encoder system based on the assessed processing capability.

According to another illustrative aspect, the retrieval system operates by: receiving an input query; mapping the input query to a query embedding using the encoder system; matching the query embedding against the target item embeddings in the index, to identify a candidate set of target item embeddings; and identifying, in a language-based filtering operation, one or more target item embeddings in the candidate set of target item embeddings that are most likely (or least likely) to match the input query. The language-based filtering operation uses language model weights that are held fixed during a training operation According to a first illustrative advantage, the technique allows a user to retrieve target items based on an input query that includes content produced by any input mode or combination input modes. Further, the technique is extensible. To introduce a new input mode, the technique trains a new input-embedding subsystem for this mode, without affecting the weights of other parts of the encoder system.

According to a second advantage, the technique matches an input query against target items in a manner that is not biased by the input mode(s) that are used to express the query.

According to a third advantage, the technique filters a candidate set of target item embeddings to eliminate target items that are not good matches for the input query. This improves the quality of retrieval results.

According to a fourth advantage, the technique throttles its encoding operation based on the capabilities of an execution platform. This provision reduces the risk that the encoding operation will overwhelm the resources of the execution platform.

This Summary is provided to introduce a selection of concepts in a simplified form; these concepts are further described below in the Detailed Description. This Summary is not intended to identify key features or essential features (or key/essential advantages) of the claimed subject matter, nor is it intended to be used to limit the scope of the claimed subject matter.

BRIEF DESCRIPTION OF THE DRAWINGS

FIG. 9 shows a process that represents one manner of operation of the encoder system of FIG. 2.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Overview of the Computing System

Figure 1:
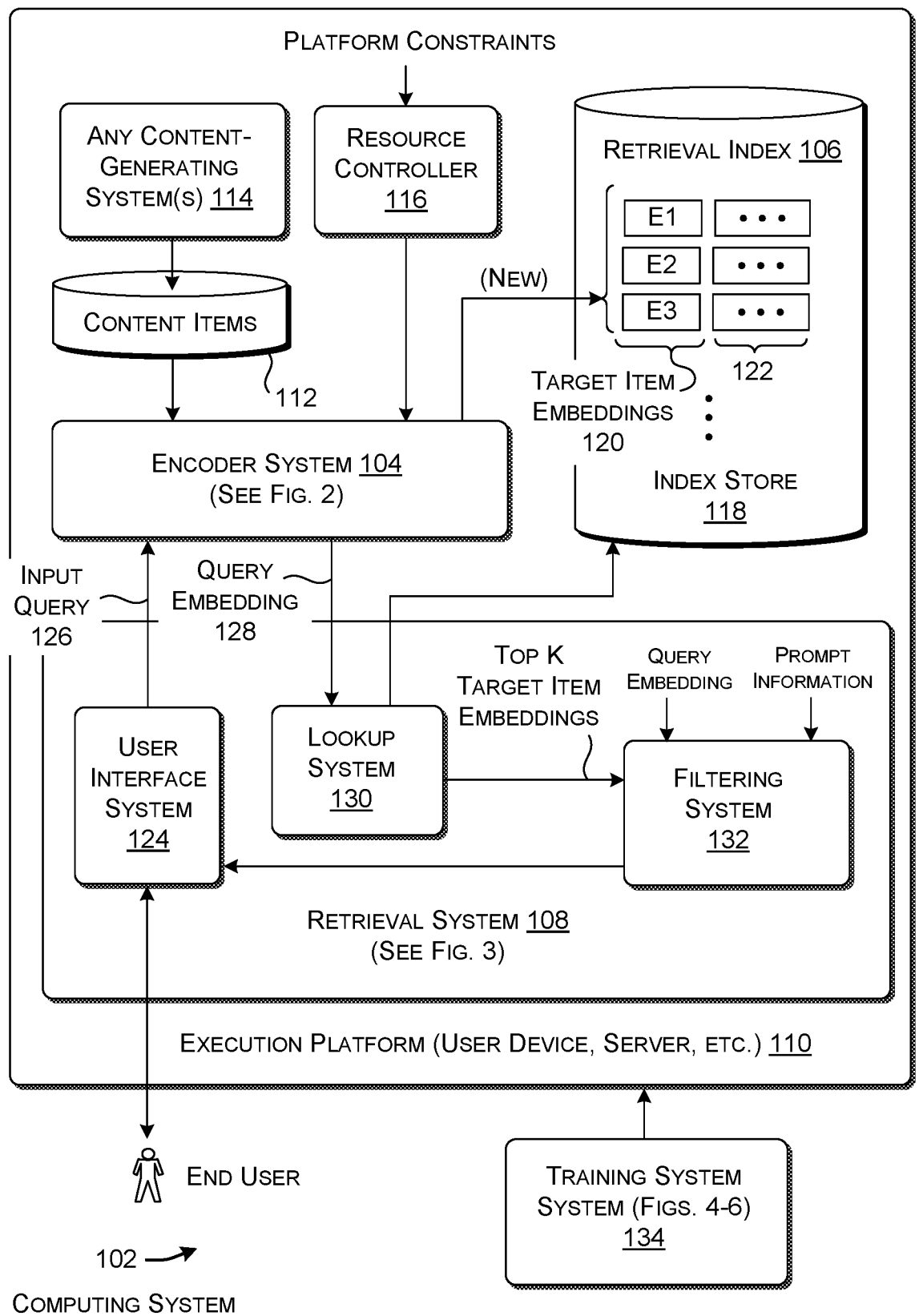
FIG. 1 shows a computing system that includes an encoder system and a retrieval system.

FIG. 1 shows a computing system 102 that includes an encoder system 104 for creating and maintaining a retrieval index 106. The computing system 102 also includes a retrieval system 108 for retrieving target items using the retrieval index 106, based on an input query submitted by an end user. This section provides an overview of the computing system 102. Section B provides additional details regarding the encoder system 104, while Section C provides additional details regarding the retrieval system 108. Section D provides information regarding illustrative techniques for training the machine-trained models used by the computing system 102.

Figure 11:
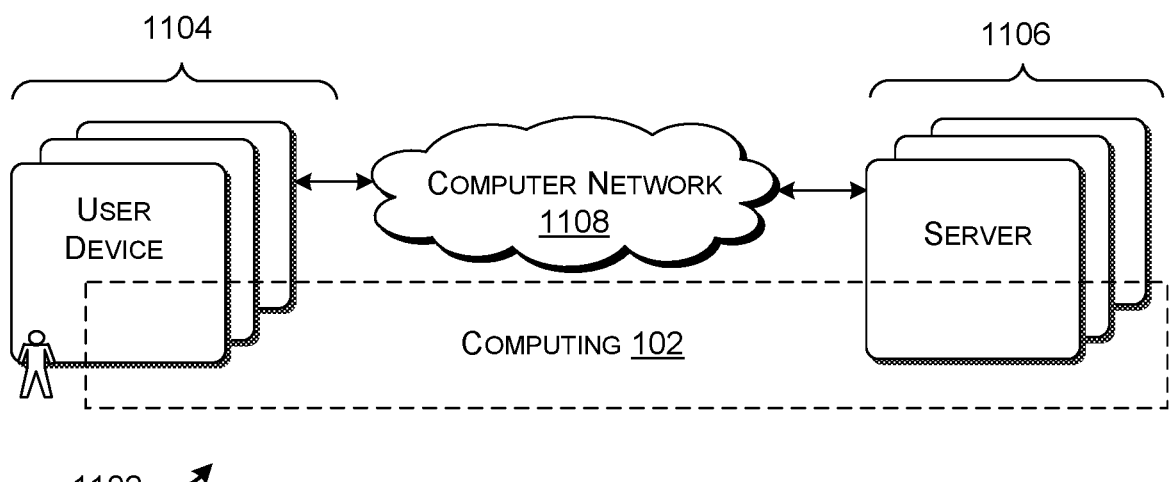
FIG. 11 shows computing equipment that, in some implementations, is used to implement the computing system of FIG. 1.
Figure 12:
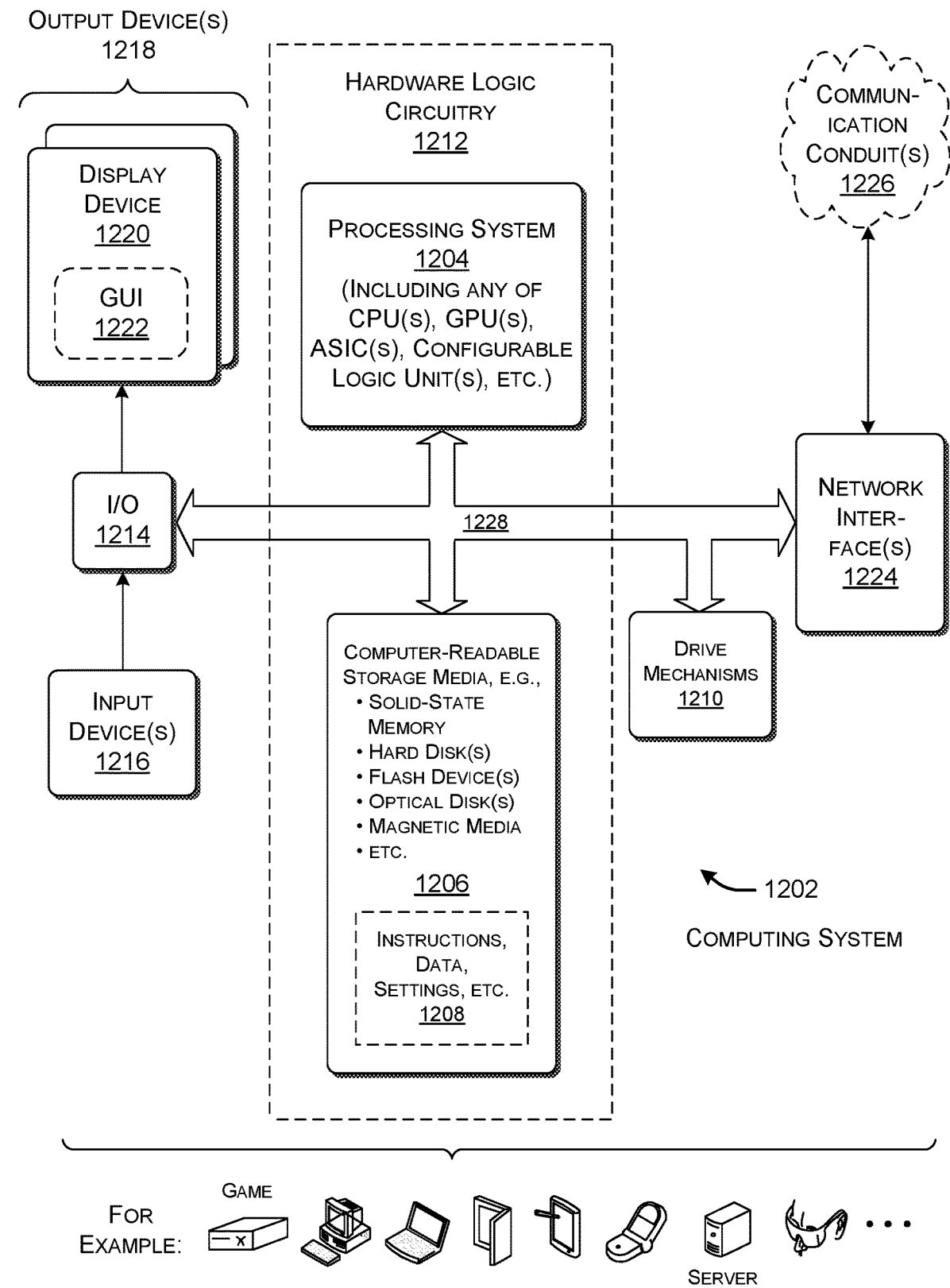
FIG. 12 shows an illustrative type of computing system that, in some implementations, is used to implement any aspect of the features shown in the foregoing drawings.

By way of terminology, as used herein, a "machine-trained model" refers to computer-implemented logic for executing a task using machine-trained weights that are produced in a training operation. A "weight" refers to any parameter value that is iteratively produced by a training operation. In some contexts, terms such as "component," "module," "engine," and "tool" refer to parts of computer-based technology that perform respective functions. FIGS. 11 and 12, described below, provide examples of illustrative computing equipment for performing these functions The computing system 102 runs on an execution platform 110. The execution platform 110 corresponds to any type of computing device or combination of computing devices. For instance, illustrative execution platforms include any of a desktop computing device, a laptop computing device, a handheld computing device of any type (such as a smartphone), a wearable computing device, a game console, a server, a group of servers, etc.

The encoder system 104 creates target item embeddings items for respective items in a content store 112. A used herein, an "item" refers to information that expresses a particular concept. An "input mode" refers to a manner of generating an item. Different methods for generating an item produce different types of content. For example, in a text input mode, any type of text input device provides an item that includes text content. In an image input mode, any type of camera captures an item that includes image content. In an audio input mode, a microphone captures an item that includes audio content. In a video input mode, a video camera captures an item that includes video content, and so on.

In some cases, an item is produced using a single input mode and includes a single type of content. In other cases, an item is produced using two or more input modes, and includes plural types of content. A "multimodal item," as the term is used herein, refers to an item that includes one or more types of content produced by one or more corresponding input modes. For instance, one kind of multimodal item corresponds to an image item together with a textual caption.

Any type of content-generating system 114 produces the items that are stored in the content store 112. For example, the content-generating system 114 encompasses: a key input device in conjunction with a word-processing program for creating text items; a camera for creating image items; a video camera for producing video items; a microphone for producing audio items, and so on. In some cases, the user may explicitly instruct the encoder system 104 to create target item embeddings for the user's document items, image items, audio items, video items, etc. Alternatively, or in addition, the user can receive items produced by others, e.g., by downloading items from an online source of items.

In other cases, the content-generating system 114 represents a logging application for creating a record of the user's activities. For example, in some cases, the content-generating system 114 stores information items extracted from sites visited by the user via a browser application, messages sent and/or received by the user using any message-sending applications, and so on. In this implementation, the content-generating system 114 operates as a background utility, creating items that reflect the user's actions as the actions happen. Likewise, the encoder system 104 continuously or periodically produces target item embeddings for new items added to the content store 112. Still other use-case scenarios are possible.

A resource controller 116 determines the processing capability of the execution platform 110. The processing capability depends, at least in part, on hardware capabilities of the execution platform 110. Illustrative components that have a bearing on the processing capability of the execution platform 110 include the platform's processing, memory, storage, and communication devices. Both the type of a particular device and the quantity (or size) of the device are relevant the execution platform's processing capabilities.

In addition, or alternatively, the processing capability reflects the current operational state of the execution platform 110. The current operational state depends on any of: the battery level of the execution platform 110; an indication of whether the execution platform 110 is connected to a constant source of power; a current load being processed by the execution platform 110; tasks that the execution platform 110 is scheduled to perform; and priority levels assigned to various tasks that the execution platform is currently performing or is scheduled to perform.

The resource controller 116 generates a control instruction based on the assessed processing capability. The control instruction specifies an amount of processing to be performed by the encoder system 104 in the course of generating the target item embeddings. For example, consider the case in which the encoder system 104 uses a language model that includes a series of N processing blocks, e.g., where N is 96. In some implementations, the control instruction specifies how many of those N processing blocks are to be invoked in the course of generating target item embeddings. For an execution platform having a processing capability above a prescribed threshold value, the resource controller 116 instructs the encoder system 104 to use all N of the processing blocks. For an execution platform having a processing capability below the prescribed threshold value, the resource controller 116 instructs the encoder system 104 to use the first M processing blocks, where M is less than N.

In some implementations, the resource controller 116 consults a rule (or rules) to select the control instruction, based on the assessed processing capability. The rule(s) can be formulated in an IF-THEN format or any other format(s). Alternatively, or in addition the resource controller 116 uses a machine-trained model to map the assessed processing capability to the control instruction. Alternatively, or in addition, a developer or the end user manually provides the control instruction to the resource controller 116. The manual specification of the control instruction effectively overrides the automated analysis performed by the resource controller 116, in whole or in part.

In some implementations, the resource controller 116 computes target item embeddings in stages based on the processing capability of the execution platform 110. For example, in a first period of time, assume that the resource controller 116 concludes that the execution platform 110 is operating in a low-battery condition and/or is handling a heavy processing load. In response, the resource controller 116 instructs the encoder system 104 to perform truncated analysis in its generation of target item embeddings. In this mode, the encoder system 104 generates and stores provisional target item embeddings. In a second period of time, assume that the resource controller 116 concludes that the execution platform 110 is now able to devote a full amount of resources to the encoder system 104, e.g., because the user's computing device is now connected to an AC power source. In response, the resource controller 116 instructs the encoder system 104 to continue processing the provisional target item embeddings it has previously generated, to produce and store final target item embeddings. For example, assume that the encoder system 104 creates a provisional target item embedding using the first M processing blocks of an N-block language model. Upon resuming its processing, the encoder system 104 further processes the provisional target item embedding using blocks M+1 to N.

The resource controller 116 is technically advantageous because it allows different execution platforms having different capabilities to make use of the encoder system 104. Further, the resource controller 116 reduces the risk that the encoder system 104 will unduly monopolize the resources of the execution platform 110, and thereby interfere with other functions performed by the execution platform 110. Many types of execution platforms can benefit from this safeguard, but it is particularly useful when applied to platforms having limited resources. This safeguard is also useful in those cases in which the encoder system 104 operates as a background utility, which constantly creates target item embeddings based on the user's activities. This type of application consumes the resources of the execution platform 110 on a long-term basis.

An index store 118 stores the retrieval index 106. The index store 118 represents one or more storage devices provided at one or more locations. The retrieval index 106 includes a set of target item embeddings 120, each of which corresponds to a distributed vector. A distributed vector is a vector that distributes its information over its d dimensions. A distributed vector is distinguished from a sparse one-hot vector that allocates a dimension to each unique concept. The retrieval index 106 also includes other information 122. For example, consider a particular entry in the retrieval index 106 associated with a particular content item. The other information for this entry may specify the location at which the content item can be accessed. Alternatively, or in addition, the other information may provide any other metadata pertaining to the content item.

In some implementations, a local computing device locally stores the retrieval index 106. A user may prefer to store the retrieval index 106 on a local computing device for privacy-related reasons. That is, by using local storage, the computing system 102 reduces the risk that unauthorized entities will gain access to the retrieval index 106.

The retrieval system 108 includes a user interface system 124 by which the user interacts with the retrieval system 108. In some implementations, the user interface system 124 receives an input query 126 from the user. The user interface system 124 also provides output results to the user, which reflect an outcome of processing performed by the retrieval system 108 in response to the submission of the input query 126.

In a typical flow of operations, the user interface system 124 sends the input query 126 to the encoder system 104. The encoder system 104 maps the input query 126 to a query embedding 128. A lookup system 130 matches the query embedding 128 against the target item embeddings in the retrieval index 106, e.g., using the cosine similarity distance metric. This yields a candidate set of top K target item embeddings ("candidate set" for brevity). While each target item embedding in the candidate set is determined to be close to the query embedding 128 in vector space, it is not necessarily actually relevant to the input query 126. To address this issue, a filtering system 132 determines the target items embeddings in the candidate set that best match the input query 126, if any. In some implementations, the filtering system 132 can perform this function by picking out the target item embeddings in the candidate set that are assessed as the most relevant. Alternatively, or in addition, the filtering system 132 performs its filtering operation by identifying one or more target item embeddings that are not relevant to the input query 126.

In some implementations, the filtering system 132 uses a language model that operates autoregressively. As input information, the language model receives the query embedding 128, the target item embeddings in the candidate set, and prompt information. The prompt information provides a text-based narrative that instructs the filtering system 132 to find the most relevant target item embeddings and/or to find the least relevant target item embeddings. In some implementations, the filtering system 132 outputs index values associated with the entries in the candidate set that are the most (or least) relevant.

A training system 134 trains machine-trained models used by the encoder system 104 and the retrieval system 108. More specially, the computing system 102 includes language models having weights that are held fixed during the training operation. In this sense, the language models are considered "frozen." The computing system 102 includes other machine-trained models that are not fixed, meaning that they are updated in the training operation. Additional details regarding one manner of conducting the training operation are set forth below in connection with FIGS. 4-6.

B. The Encoder System

Figure 2:
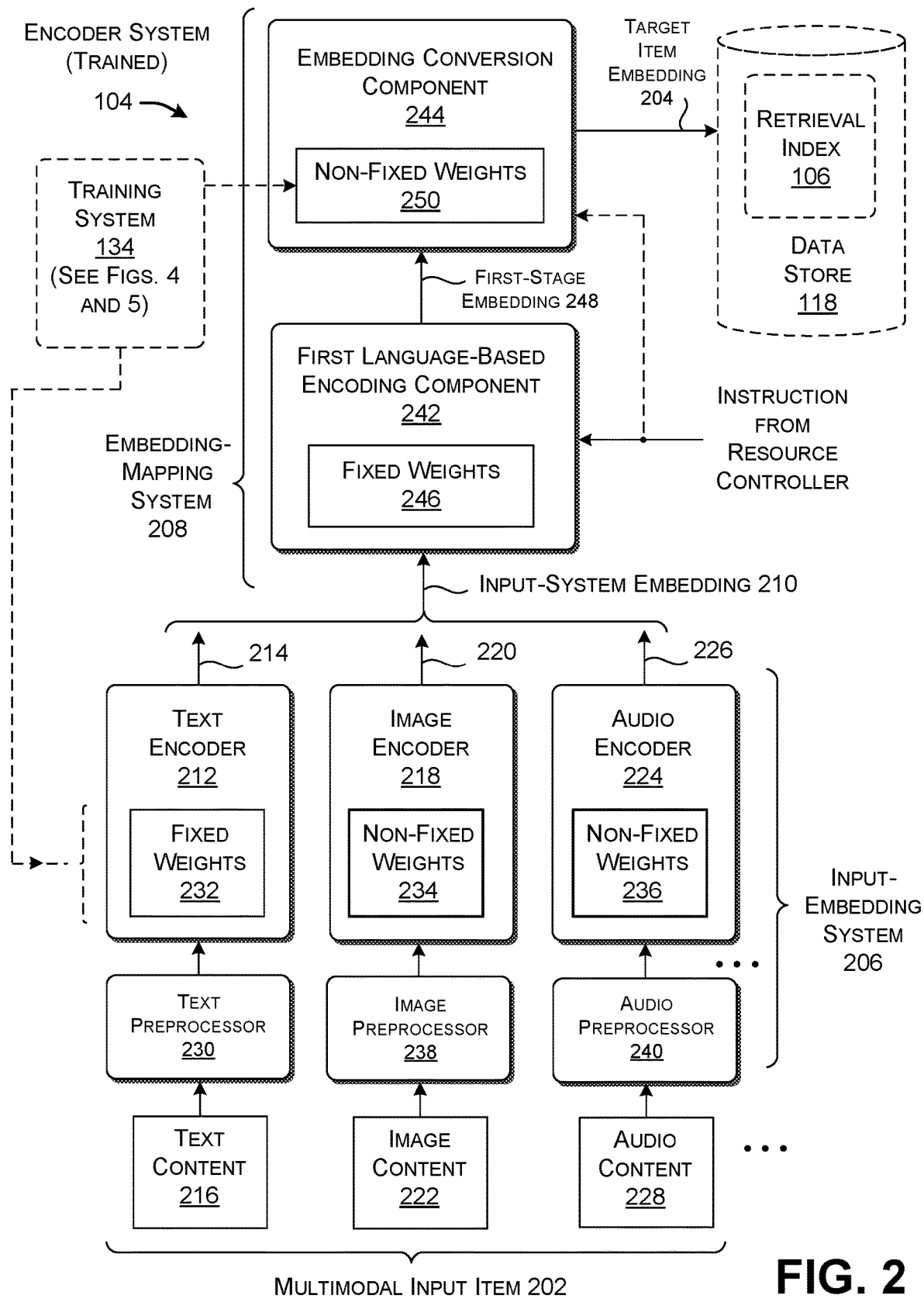
FIG. 2 shows one implementation of the encoder system of FIG. 1.

FIG. 2 shows one implementation of the encoder system 104 in its production or inference stage of operation, that is, after it has been trained by the training system 134. FIG. 2 specifically describes the encoder system 104 in the simplified context in which it maps a single input item 202 to a target item embedding 204. In practice, the encoder system 104 can perform this operation for plural items, e.g., in series and/or in parallel.

The encoder system 104 includes two main systems: an input-embedding system 206 and an embedding-mapping system 208. The input-embedding system 206 maps the input item 202 to an input-system embedding 210. The embedding-mapping system 208 maps the input-system embedding 210 to the target item embedding 204. Broadly stated, the encoder system 104 uses the input-embedding system 206 to convert text and non-text content into the language-based vector space of the embedding-mapping system 208. This allows the embedding-mapping system 208 to adopt an agnostic view as to the ultimate origin of the input item 202. From the "perspective" of the embedding-mapping system 208, in all cases, it is engaged in the task of processing a sequence of words.

Referring first to the input-embedding system 206, this system 206 includes a plurality of input-embedding subsystems. The subsystems include a text encoder 212 for producing a text embedding 214 based on text content 216, an image encoder 218 for producing an image embedding 220 based on image content 222, and an audio encoder 224 for producing an audio embedding 226 based on audio content 228, and so on. This list is non-exhaustive: other input encoders include a video encoder for processing video content, a three-dimensional-data encoder for processing three-dimensional data (e.g., as received from the KINECT device or HOLOLENS device provided by MICROSOFT CORPORATION of Redmond, Washington), a sensor-based encoder for processing the output of sensors of any type(s), an application that provides markup language content, and so on. The input-embedding system 206 assembles the individual embeddings (214, 220, 226, . . . ) into the input-system embedding 210 in any manner, such as by concatenating the separate embeddings (214, 220, 226, . . . ).

In some implementations, each input-embedding subsystem includes an input preprocessor (e.g., a tokenizer) for converting an instance of content into one or more units of representation (e.g., tokens). Each input-embedding subsystem also includes a machine-trained model of any type for mapping the tokens (or other units of representation) into an input embedding. Each such machine-trained model is governed by a set of weights.

Consider, for instance, the text encoder 212. This input-embedding subsystem includes a text preprocessor 230 for segmenting the text content 216 into a series of tokens. A machine-trained model uses fixed weights 232 to map the tokens into the text embedding 214. As used herein, the term "fixed" indicates that the weights remain fixed during a training operation (to be described in Section D below). The term "non-fixed" indicates that the weights are not fixed during the training operation. That is, non-fixed weights are iteratively updated during the training operation. Note that FIG. 2 indicates that the text preprocessor's weights 232 are fixed, but that the weights of other input-embedding subsystems are non-fixed. For instance, a set of weights 234 used by the image encoder 218 are not fixed. Likewise, a set of weights 236 used by the audio encoder 224 are not fixed.

Different implementations of the text preprocessor 230 perform tokenization in different respective ways. For example, in some implementations, the text preprocessor 230 breaks the text content 216 into a sequence of linguistic tokens, which are concatenated together. In some examples, the text preprocessor 230 allocates a token to each complete word in the text content 216. In other examples, the preprocessor 230 creates tokens for the respective character n-grams that compose the text content 216. A character n-gram is a sequence of n characters in a word. For instance, with n=3, the word "Gates" includes the n-grams "#Ga," "Gat," "ate," "tes," and "es #," where "#" is an added demarcation token. In other cases, the text preprocessor 230 uses any type of algorithmic approach to generate linguistic tokens, including any of: the byte pair encoding (BPE) algorithm; the WordPiece algorithm; the SentencePiece algorithm, etc. In general, some of these approaches attempt to break up text into components based on the frequency at which combinations of characters appear in a natural language.

In some implementations, the text preprocessor 230 adds a special classification ("CLS") token to the beginning of the sequence of linguistic tokens. The text preprocessor 230 adds a terminal "SEP" token to the end of each subsequence of linguistic tokens. Other implementations omit the use of these special characters, or use some other types of special characters.

In some implementations, the text encoder 212 uses a machine-trained neural network of any type (e.g., a feed-forward neural network of any type) to map a one-hot vector representation of a linguistic token to a token embedding in the form of a distributed vector. In some implementations, the text encoder 212 optionally adds position information to each token embedding, to produce a series of position-supplemented token embeddings. A particular instance of position information describes the position of a particular linguistic token in the sequence of linguistic tokens.

The text encoder 212 optionally performs any post-processing operations on the sequence of position-supplemented token embeddings. For example, in some cases, the text encoder 212 uses a transformer-based model to map the position-supplemented token embeddings into the text embedding 214. In some implementations, the text embedding 214 represents a single classification result produced by the text encoder 212 (e.g., corresponding to the encoded counterpart of the CLS token). In other cases, the text embedding 214 represents a series of output embeddings for individual text tokens in the text content 216. Background information on the general topic of encoding text-based content using transformer-based models can be found at: Vaswani, et al., "Attention Is All You Need," arXiv, Cornell University, arXiv:1706.03762v5 [cs.CL], Dec. 6, 2017 15 pages; and Devlin, et al., "BERT: Pre-training of Deep Bidirectional Transformers for Language Understanding," arXiv, Cornell University, arXiv:1810.04805v2 [cs.CL], May 24, 2019, 16 pages.

Other input-embedding subsystems perform their own respective forms of content partitioning and embedding. For example, in some implementations, an image preprocessor 238 produces image-based input data that expresses the individual pixel values that compose the image content 222 (after optionally downsizing, cropping, and/or normalizing the image content 222). In some implementations, the image encoder 218 uses a convolutional neural network (CNN) to map the image-based input data into the image embedding 220. The image embedding 220 represents a single distributed vector produced by a final layer of the CNN, or represents a series of distributed vectors produced by the CNN, e.g., corresponding to individual features of the image content 222.

In other cases, the image preprocessor 238 breaks the image content 222 into a series of image patches, such as 16 image patches. The image patches constitute image tokens, akin to the text tokens produced by the text preprocessor 230. The image encoder 218 then relies on a transformer-based model to map the image tokens into the image embedding 220. Again, the image embedding 220 may represent a single distributed vector or plural distributed vectors (e.g., corresponding to the respective image tokens). Background information regarding the general topic of encoding image content can be found at: He, et al., "Deep Residual Learning for Image Recognition," arXiv, Cornell University, arXiv:1512.03385v1 [cs.CV], Dec. 10, 2015, 12 pages; and Dosovitskiy, et al., "An Image is Worth 16×16 Words: Transformers for Image Recognition at Scale," arXiv, Cornell University, arXiv:2010.11929v2cs.CV], Jun. 3, 2021, 22 pages.

In some implementations, an audio preprocessor 240 converts the audio content 228 into a stream of audio features that characterize the audio content 228, organized into a series of audio frames. For example, the audio features correspond to Mel-frequency cepstral coefficients (MFCCs). The audio encoder 224 then processes the audio features using any combination of acoustic models (e.g., Hidden Markov Models), language models, etc., to produce the audio embedding 226.

In other examples, the audio preprocessor 240 produces a logarithm melspectrogram based on the audio content 228. The audio preprocessor 240 then partitions the melspectrogram into individual patches, akin to the above-summarized case of image processing. The individual patches constitutes audio tokens. The audio encoder 224 then uses a transformer-based model to convert the audio tokens into the audio embedding 226. The audio embedding 226 corresponds to a single distributed vector or plural distributed vectors (e.g., associated with respective audio features of the audio content 228). Background information on the general topic of encoding audio content can be found, for instance, in Tan, et al., "A Survey on Neural Speech Synthesis," arXiv, Cornell University, arXiv:2106.15561v3 [eess.AS], Jul. 23, 2021, 63 pages; and Gong, et al., "AST: Audio Spectrogram Transformer," arXiv, Cornell University, arXiv:2104.01778v3 [cs.SD], Jul. 8, 2021, 5 pages.

Although not shown in FIG. 2, a video preprocessor partitions video content in any manner. For example, in some cases, the video preprocessor produces a set of tokens for each frame of the video content, e.g., using any of the image-tokenization techniques described above. In other cases, the video preprocessor produces tokens that characterize individual video clips, each of which includes one or more frames. The video encoder (not shown) maps the video tokens into a video embedding, corresponding to one or more distributed vectors. The video encoder can use any technology to perform this task, including a CNN-based model, a transformer-based model, and so on. For instance, the video encoder can use a three-dimensional CNN model to capture spatiotemporal information in a stream of video information. General background information on the subject of encoding video information can be found at Selva, et al., "Video Transformers: A Survey," arXiv, Cornell University, arXiv:2201.05991v3 [cs.CV], Feb. 13, 2023, 26 pages.

Now referring to the embedding-mapping system 208, this element includes two subsystems: a first language-based encoding component 242 and an embedding conversion component 244. The first language-based encoding component 242 uses fixed weights 246 to map the input-system embedding 210 to a first-stage embedding 248. The embedding conversion component 244 uses non-fixed weights 250 to map the first-stage embedding 248 to the target item embedding 204. The target item embedding 204 corresponds to the representation of the input item 202 that is stored in the retrieval index 106. To repeat, "fixed weights" or "frozen weights" refer to weights that are held constant during the training operation performed by the training system 134, while "non-fixed weights" refer to weights that are updated during the training operation.

In some implementations, the first language-based encoding component 242 uses a transformer-based model. This component is characterized as "language-based" because the fixed weights 246 are produced in a pre-training operation, based on one or more generic language-modeling tasks. The embedding conversion component 244 maps the first-stage embedding 248 into the vector space associated with the retrieval index 106. The embedding conversion component 244 includes non-fixed weights 250 that are optimized during the training operation. The embedding conversion component 244 is specifically trained with the goal of promoting the ability of the retrieval system 108 to match queries against the retrieval index 106 in an effective manner.

The target item embeddings stored in the retrieval index 106 may be considered universal and input-agnostic. A target item embedding is "universal" in the sense that a single target item embedding represents a unique concept, regardless of the input mode that was used to express the concept, or the plural input modes that were used to collectively describe the concept. The target item embedding is "input agnostic" for the same reasons; that is, an input query that expresses a target concept will map to the same target item embedding, regardless of the type of content used to express the query. For example, an input query that describes a particular kind of dog will map to the same target item embedding, regardless of whether input query describes the dog using text, image, video, audio, etc., or any combination thereof.

As a whole, the encoder system 104 uses a unified framework for mapping different kinds of multimodal input items into target item embeddings, in which all input items are ultimately treated as language-bearing items. This unified approach enables the retrieval system 108 to retrieve target items using the retrieval index 106 with reduced bias attributed to input mode. For instance, assume that an input query expresses the concept of a particular breed of dog by presenting an image showing this type of dog. Assume that the most relevant target item embedding originates from a textual description of this breed of dog, and that the second most-relevant target item embedding originates from a picture of a fox. The retrieval system 108 will not promote the target item embedding for the fox over the more relevant target item embedding for the dog simply because the target item embedding for the fox originates, like the input query, from an image. Other vector-based retrieval systems exhibit substandard performance in this case, e.g., because they use separate systems to encode instances of content captured by different input modalities, and then apply post-processing operations to align related instances of content. This kind of processing is not effective in removing mode-specific bias from target item embeddings, and, consequentially, is not effective in removing mode-specific bias in retrieval results. The retrieval system 108 includes other safeguards to ensure that it correctly matches an input query with target items, as will be described next in Section C.

C. The Retrieval System

Figure 3:
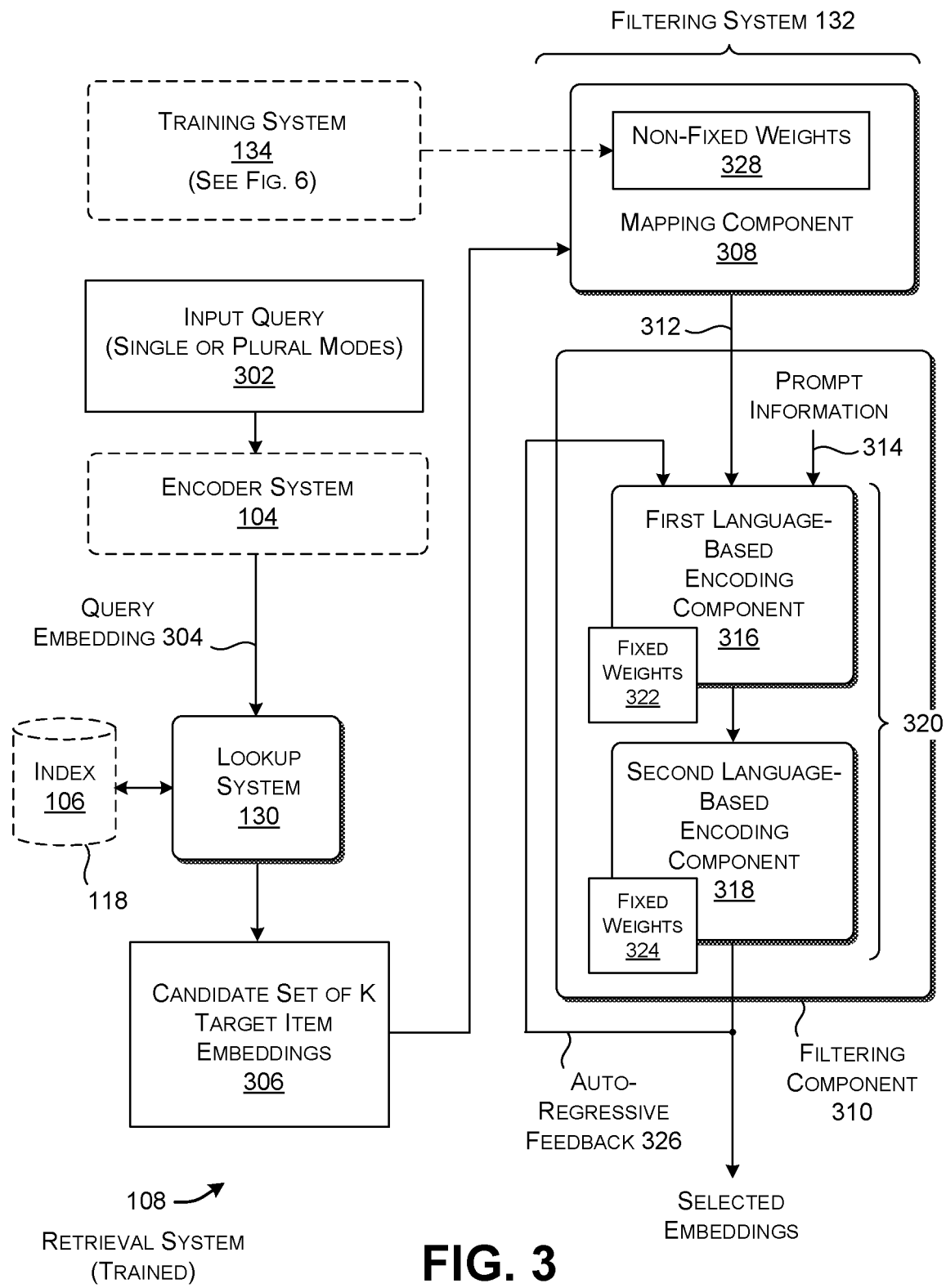
FIG. 3 shows one implementation of the retrieval system of FIG. 1.

FIG. 3 shows one implementation of the retrieval system 108. The retrieval system 108 operates in two stages: a lookup phase and a filtering phase. In the lookup phase, the retrieval system 108 uses the encoder system 104 to map an input query 302 to a query embedding 304. That is, referring back to FIG. 2, the encoder system 104 uses the input-embedding system 206 to map the input query 302 into an input-system embedding 210. The encoder system 104 then uses the embedding-mapping system 208 to map the input-system embedding 210 into the query embedding 304. The input query 302 can include content produced by any single input mode described above, or any combination of input modes. For example, the input query 136 can include text content, or a combination of text content and image content. In contrast, other vector-based retrieval systems cannot effectively handle a situation in which a single input item includes instances of content created using different input modes.

The lookup system 130 matches the query embedding 304 against the target item embeddings in the retrieval index 106, to produce a candidate set 306 of top K target item embeddings ("candidate set" for brevity). The lookup system 130 determines the similarity between the query embedding 304 and any target item embedding using any distance metric, such as cosine similarity. A target item embedding having the closest distance to the query embedding is the top entry in the candidate set 306. Further, the lookup system 130 uses any technique to search the retrieval index 106. For example, in some cases, the lookup system 130 performs an exhaustive search through all of the target item embeddings in the retrieval index 106 to find the K target item embeddings having the closest distance to the query input embedding. In other cases, the lookup system 130 uses an approximate nearest neighbor (ANN) technique to search the retrieval index 106.

In the filtering stage, a filtering system 132 validates the results of the lookup system 130 to ensure that the target item embeddings that the lookup system 130 identifies are truly relevant to the input query 302 (as represented by the query embedding 304). The filtering system 132 includes two main components: a mapping component 308 and a language-based filtering component 310. The mapping component 308 maps the candidate set 306 into the same language-based vector space as the filtering component 310, to produce a set of transformed target item embeddings ("transformed set" 312 for brevity). The filtering component 310 autoregressively maps the transformed set 312 into output results. The output results identify the members of the candidate set 306 that are most relevant to the input query 302 (if any), and/or the members of the candidate set 306 that are not relevant to the input query 302.

For example, assume that the input query 302 specifies a concept of a particular breed of cat, and the top target item embedding in the candidate set 306 encodes the concept of a particular breed of dog. This outcome may reflect the fact that there is no target item embedding corresponding to the concept of the cat breed specified in the input query 302; rather, the query embedding 304 is closest to a target item embedding for the particular kind of dog. In this situation, the filtering system 132 flags the top target item embedding as not being relevant to the input query 302, upon which the retrieval system 108 eliminates it from the output results it provides to the user.

In some implementations, the filtering component 310 specifically operates on input information that includes the transformed set 312 (provided by the mapping component 308) in combination with the query embedding 304 and the prompt information 314. The prompt information 314 constitutes a text-based narrative that describes the task that the filtering component 310 is expected to perform. For example, the prompt information 314 may specify that the filtering component 310 is to identify the members of the candidate set 306 that are: 1) the most relevant to the input query 302; or (2) the least relevant to input query 302; or (3) not at all relevant to the input query 302. A specific example of input information states: "Identify the members of the set [Candidate Set] that are inconsistent with the query [Query]. Identify the inconsistent members by specifying their indices." "Candidate Set" refers to the candidate set 306, and "Query" refers to the input query 302. In some implementations, a developer and/or user manually crafts the prompt information 314. Alternatively, or in addition, a machine-trained model produces the prompt information 314 in a prior training operation.

More generally, the filtering component 310 functions as a pattern-completion engine that operates on input information that is composed of a series of input tokens T1, T2, T3, . . . , TN. Here, the text tokens are made up the query embedding 304, the transformed target item embeddings (produced by the mapping component 308), and the prompt information 314. The pattern-completion engine analyzes the input information, and, based thereon, predicts a next token that is likely to follow the input information. In a second pass, the pattern-completion engine appends the predicted token to the end of the preceding series of input tokens, to produce an updated instance of input information. The pattern-completion engine then processes the updated input information to predict a next token. This process continues until the pattern-completion engine generates a stop token, which it interprets as a request to stop generating tokens. Note that the pattern-completion engine generates each completion based on knowledge of statistical patterns expressed in many other text fragments, which it captures in a pre-training operation. Thus, the input information fed to the pattern-completion engine is not an instruction in a classical sense of a programmatic directive, but a way to constructively guide or condition the pattern-completion engine in performing its pattern-completion analysis.

In some implementations, the filtering component 310 is composed of a first language-based encoding component 316 and a second language-based encoding component 318. Together, the first language-based encoding component 316 and the second-based encoding component 318 constitute a language model 320. In some implementations, the first language-based encoder component 316 is the same model as the first language-based encoding component 242 of the encoder system 104 (of FIG. 2). In some implementations, both the first language-based encoding component 316 and the second language-based encoding component 318 use a transformer-based language model having fixed weights (322, 324), or some other kind of attention-based machine-trained model having fixed weights (322, 324).

More specifically, the first language-based encoding component 316 maps the input information described above to first results. The second language-based encoding component 318 maps the first results to second results. The second results specify the member(s) of the candidate set 306 that are particularly relevant (and/or not relevant). A feedback path 326 represents the autoregressive manner of operation of the filtering component 310, whereby the filtering component 310 adds a predicted token to the previous instance of input information, to produce an updated instance of input information.

In some implementations, the mapping component 308 uses a set of non-fixed weights 328 which are updated during the training operation. Thus, the filtering system 132 as a whole uses some weights that are fixed during training, and other weights that are not. The same is true of the encoder system 104 described in Section B.

Further note that filtering component 310 and the encoder system 104 make different uses the fixed-weight language model. That is, the encoder system 104 uses the fixed-weight language model to map an input item to a target item embedding in a single pass (that is, not autoregressively). The filtering component 310 uses the fixed-weight language model to autoregressively validate the results of the lookup system 130.

D. The Training System

Figure 4:
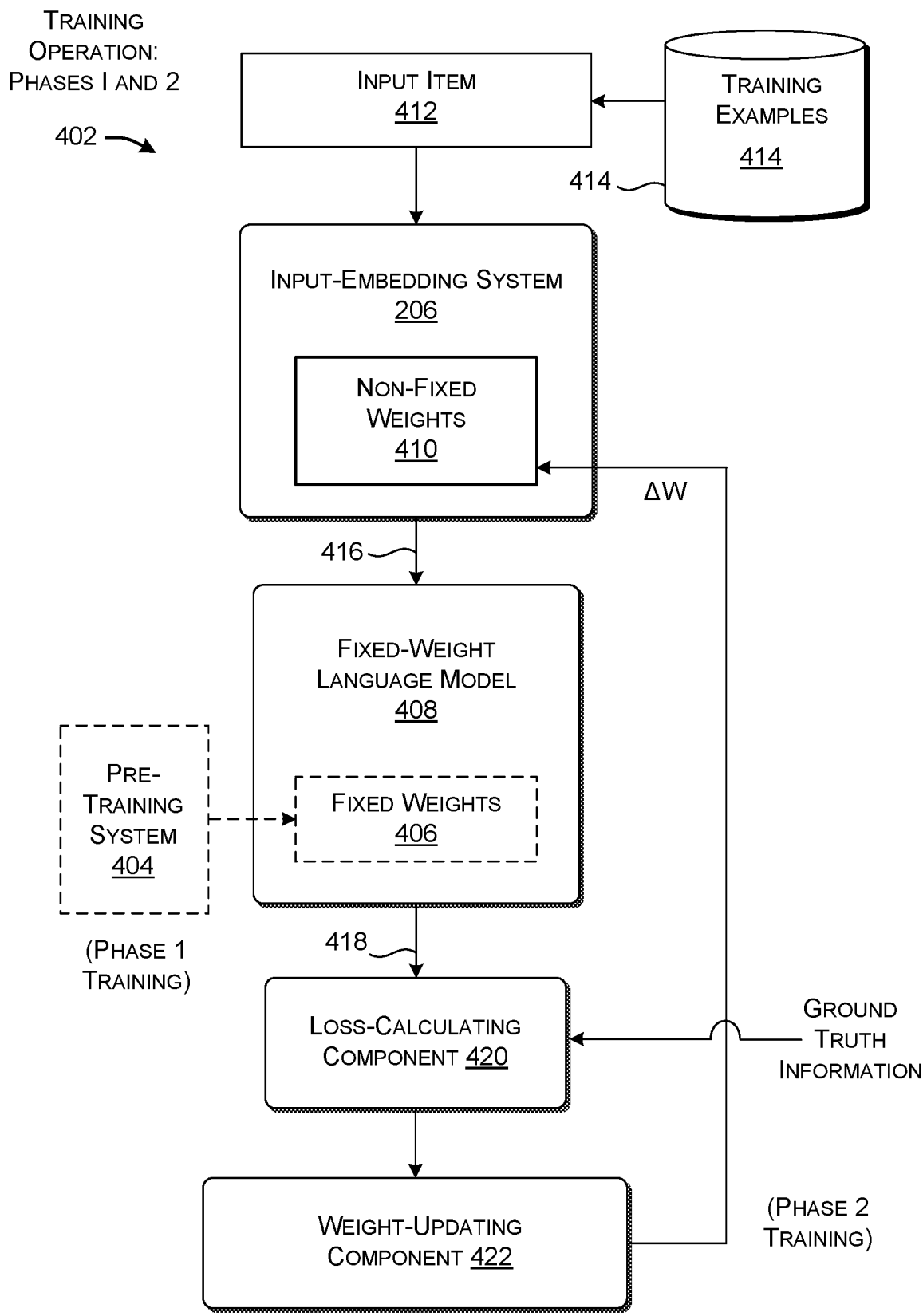
FIG. 4 shows a first and second phases of a training operation performed by a training system of FIG. 1.
Figure 5:
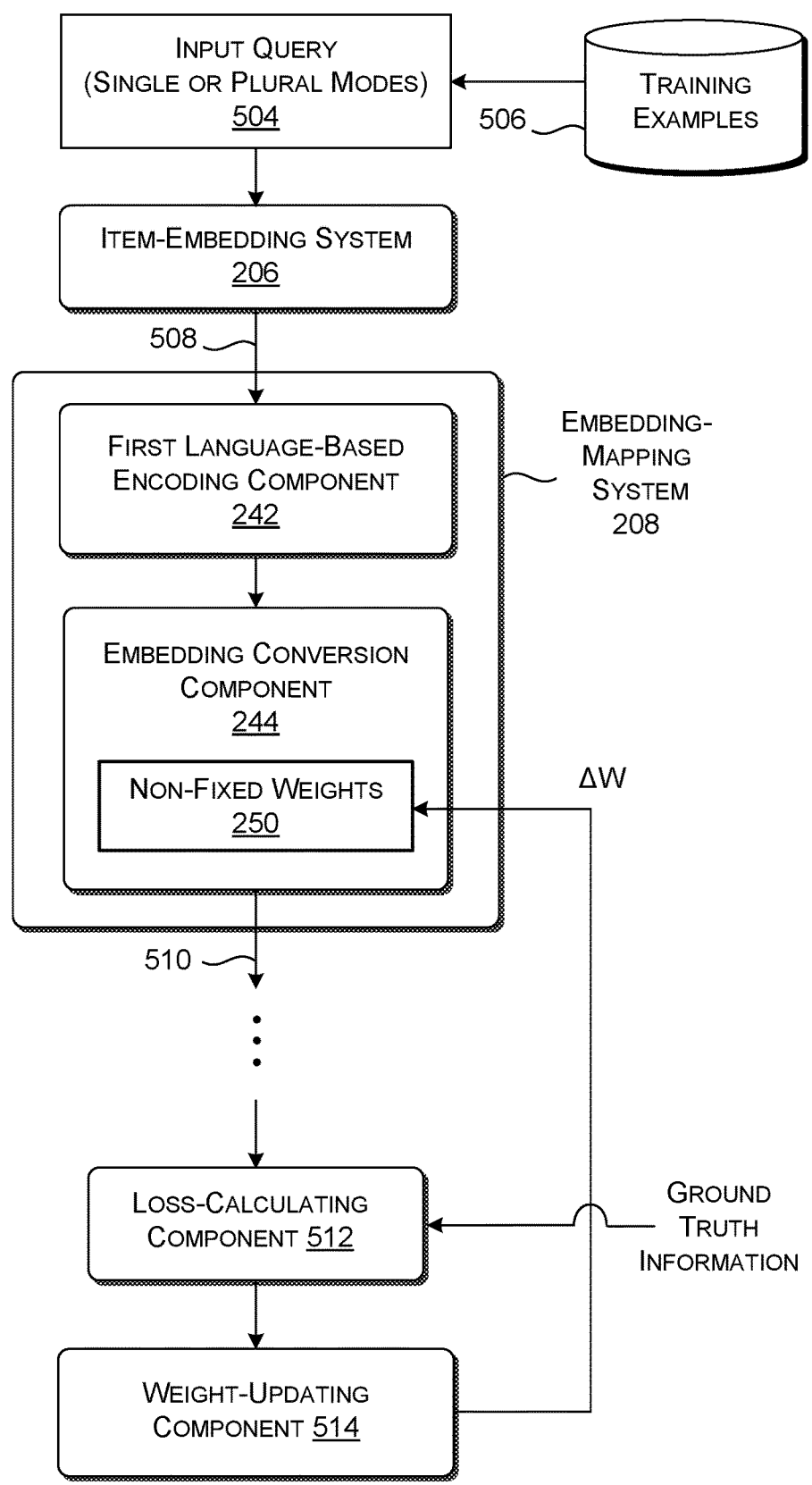
FIG. 5 shows a third phase of a training operation performed by the training system of FIG. 1.
Figure 6:
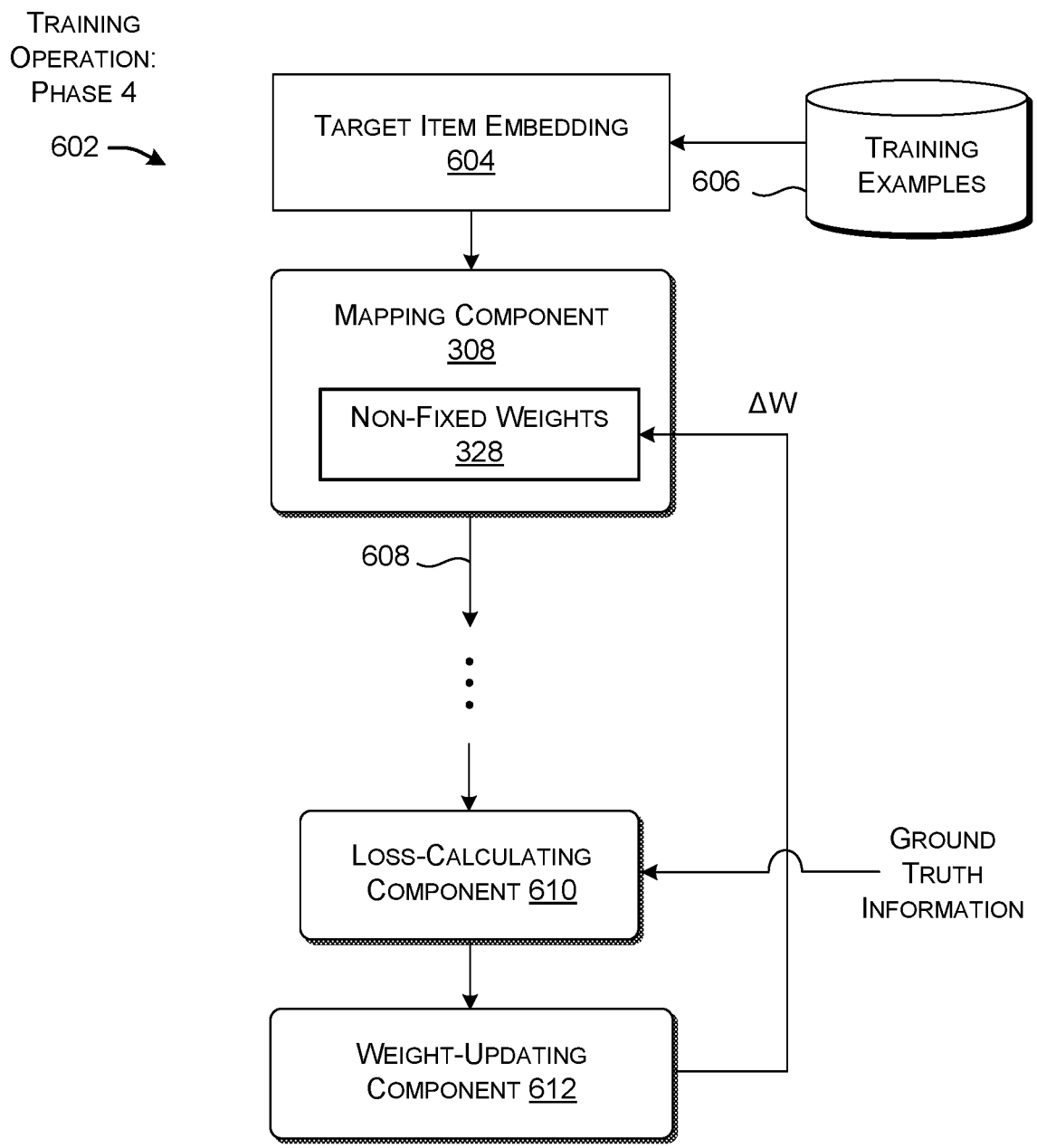
FIG. 6 shows a fourth phase of a training operation performed by the training system of FIG. 1.

In some implementations, the training system 134 trains the weights of the computing system 102 in one or more stages. FIG. 4 summarizes the first two phases 402 of training. FIG. 5 summarizes a third phase 502 of training, and FIG. 6 summarizes a fourth phase 602 of training. In other implementations, two or more sets of weights that are described below as being separately trained in FIGS. 4-6 can be trained at the same time.

Beginning with FIG. 4, a pre-training system 404 performs training to produce fixed weights 406 of a language model 408. More specifically, these weights 406 include the fixed weights 246 of the first language-based encoding component 242 of the encoder system 104, the fixed weights 322 of the first language-based encoding component 316 of the filtering component 310 (which are the same as the weights 246), and the fixed weights of the 324 of the second language-based encoding component 318 of the filtering component 310. After pre-training, these weights 406 are considered fixed. Note, however, that the developer of the computing system 102 need not conduct the pre-training; rather, the developer may receive a pre-trained language model from any source. For instance, a publicly available transformer-based model for performing pattern completion is the BLOOM model available from HUGGING FACE, INC., of New York, New York, the latest version of which is Version 1.3 released on Jul. 6, 2022

The pre-training system 404 performs pre-training with respect to one or more generic language-modeling tasks. For instance, in a first language-modeling task, the pre-training system 404 randomly masks tokens in a sequence of input tokens fed to the language model 408. The pre-training system 404 assesses an extent to which the language model 408 can successfully predict the identities of the masked tokens, and updates the weights 406 of the language model 408 accordingly. In a second language-modeling task, the pre-training system 404 feeds two concatenated sentences to the language model 408. The pre-training system 404 then measures an extent to which the language model 408 can successfully predict whether the second sentence properly follows the first sentence (with reference to ground-truth information that indicates whether the second sentence properly follows the first sentence), and then updates the weights 406 of the language model 408 accordingly.

In a second training phase, the training system 134 trains the weights 410 of the input-embedding system 206 of the encoder system 104. For example, in this phase, the training system 134 updates the weights 234 of the image encoder 218, the weights 236 of the audio encoder 224, and so on. (Note that, in some implementations, the weights 232 of the text encoder 212 are considered part of the language model 408, and therefore are fixed; in other cases, the weights 232 are not fixed and are updated in the second phase.) The training system 134 will be explained below in the context of the processing of a single training example. The single training example includes an input item 412 together with an instance of ground-truth information. A data store 414 stores a plurality of training examples. In actual practice, in some cases, the training system 134 performs training on a batch of training examples.

The input-embedding system 206 maps the input item 412 to an input-system embedding 416. The language model 408 then maps the input-system embedding 416 to a prediction 418. A loss-calculating component 420 determines the difference between the prediction and ground-truth information, e.g., using cosine similarity or any other distance metric. In some examples, the ground-truth information corresponds to an embedding within the vector space of the language model 408 that is accepted as a correct representation of the input item 412. For example, assume that the input item 412 shows a picture of a particular breed of dog. The ground-truth information represents an embedding in the vector space of the language model 408 that is accepted as a correct representation of this breed of dog. More generally, the loss-calculating component 420 can compute loss information based on any loss function, including a cross-entropy loss function, a contrastive loss function, a triplet loss function, and so on. Contrastive loss information for a pair of vectors (A, B$^+$) is computed as follows:

$$L_{sim} = -\log \frac{\exp(sim(A, B^+))}{\Sigma_i \exp(sim(A, B_i^-))}. \tag{1}$$

sim(A, B$^+$) refers to the similarity between vectors A and B$^+$ that are known to express similar concepts, and sim(A, B$_i^-$) refers to the similarity between vectors A and B$_i^-$ that are known to express unrelated concepts. Contrastive loss has the effect of pulling similar concepts together and pushing unlike concepts apart.

A weight-updating component 422 uses a combination of backpropagation and stochastic gradient descent to compute updated weights. The weight-updating component 422 then modifies the weights 410 of the input-embedding system 206 based on the updated weights. In this operation, the weight-updating component 422 calculates the updated weights by back-propagating the loss information through all of the layers of the language model 408 and the input-embedding system 206, in the form of gradients. But the weight-updating component 422 does not actually update the weights 406 of the language model 408, as these weights 406 are considered fixed.

Note that the input-embedding system 206 of FIG. 1 is extensible because it allows a developer or end user to add a new input-embedding subsystem to the input-embedding system 206 after the other input-embedding subsystems have been trained. The training system 134 trains the new input-embedding subsystem by treating the weights of all other models as fixed. That is, the fixed weights include the weights of the language model and the weights of the pre-existing input-embedding subsystems.

For example, assume that the input-embedding system 206 originally includes the text encoder 212, image encoder 218, and audio encoder 224. Assume that a developer later adds a video encoder to the input-embedding system 206. The training system 134 trains the weights of the video encoder while keeping the weights of all other models fixed. The loss-calculating component 420 can compute loss information in this situation in different ways. Consider the specific case in which the target item embedding for a particular breed of dog already exists (e.g., as originally computed based on the input modalities of text, image, and audio). Assume that a new training example includes an input item that includes a video item that depicts this particular breed of dog. The loss-calculating component 420 can generate an instance of loss information that depends on the difference between the preexisting target item embedding for this breed of dog and the newly-generated target embedding generated for the input item (that incorporates the video of this breed of dog). In other words, the training system 134 treats the pre-existing embedding for this breed of dog as ground-truth information.

Other implementations of the second phase assess loss information in different ways compared to the techniques described above. For instance, in another implementation, the input item 412 presents textual prompt information together with one or more non-text items, such as an image. For example, assume that the image shows a picture of an aardvark, and the textual prompt information poses the question: "What is this?" The fixed-weight language model 408 autoregressively maps the input-system embedding 416 into an answer. The loss-calculating component 420 then compares the answer to a ground-truth answer.

FIG. 5 shows the third phase 502 of the training performed by the training system 134. The purpose of the third phase 502 is to train the weights 250 of the embedding conversion component 244 (of the encoder system 104). The weights of the first language-based encoding component 242 are considered fixed, and are not updated. The training system 134 will again be explained below in the context of the processing of a single training example. The single training example includes an input query 504 together with an instance of ground-truth information. A data store 506 stores a plurality of training examples.

The input-embedding system 206 maps the input query 504 to an input-system embedding 508. The embedding-mapping system 208 maps the input-system embedding 508 to a query embedding 510. The embedding-mapping system 208 includes the first language-based encoding component 242 (having fixed weights 246) and the embedding conversion component 244 (having non-fixed weights 250).

A loss-calculating component 512 determines the difference between the query embedding 510 and ground-truth information, e.g., using cosine similarity or any other distance metric. In some example, the ground-truth information corresponds to an embedding within the vector space of the conversion component 244 (and the retrieval index 106) that is accepted as a correct representation of the input query 504. More generally, the loss-calculating component 512 computes loss information based on any loss function, including a cross-entropy loss function, a contrastive loss function, a triplet loss function, and so on. A weight-updating component 514 computes updated weights using stochastic gradient descent in combination with backpropagation. The weight-updating component 514 then updates the weights 250 of the embedding conversion component 244 based on the results of its analysis.

Other implementations of the third phase assess loss information in different ways compared to the techniques described above. For instance, in another implementation, the training system 134 uses the lookup system 130 to generate a candidate set of target item embeddings based on the query embedding. The loss-calculating component 512 then computes loss information by comparing the candidate set with a ground-truth set of target item embeddings.

FIG. 6 shows the fourth phase 602 of the training performed by the training system 134. The purpose of the fourth phase 602 is to train the weights 328 of the mapping component 308 used in the retrieval system 108. The training system 134 will again be explained below in the context of the processing of a single training example. The single training example includes a target item embedding 604 produced by the lookup system 130, together with an instance of ground truth information. A data store 606 stores a plurality of training examples.

The mapping component 308 maps the target item embedding 604 into a transformed item embedding 608 in the vector-space of the language model 320 (of the filtering component 310 shown in FIG. 3). A loss-calculating component 610 compares the transformed item embedding 608 with ground-truth information, and, based thereon, generates loss information. For example, the ground-truth information describes an embedding in the vector space of the language model 320 that is considered to be a correct counterpart of the target item embedding 604. The loss-calculating component 610 can use any loss function to assess the loss information, including a cross-entropy loss function, a contrastive loss function, a triplet loss function, etc. A weight-updating component 612 computes updated weights using stochastic gradient descent in combination with backpropagation. The weight-updating component 612 then updates the weights 328 of the mapping component 308 based on the results of its analysis.

Other implementations of the fourth phase assess loss information in different ways compared to the techniques described above. For instance, in another implementation, the training system 134 uses the filtering component 310 (of FIG. 3) to map the transformed item embedding 608 together with prompt information to an indication of whether the target item embedding 604 is relevant to an input query. The loss-calculating component 610 then compares this indication with a ground-truth result, indicating whether or not the transformed item embedding 608 is indeed relevant to the input query.

E. Illustrative Machine-Trained Models

Figures 7, 8:
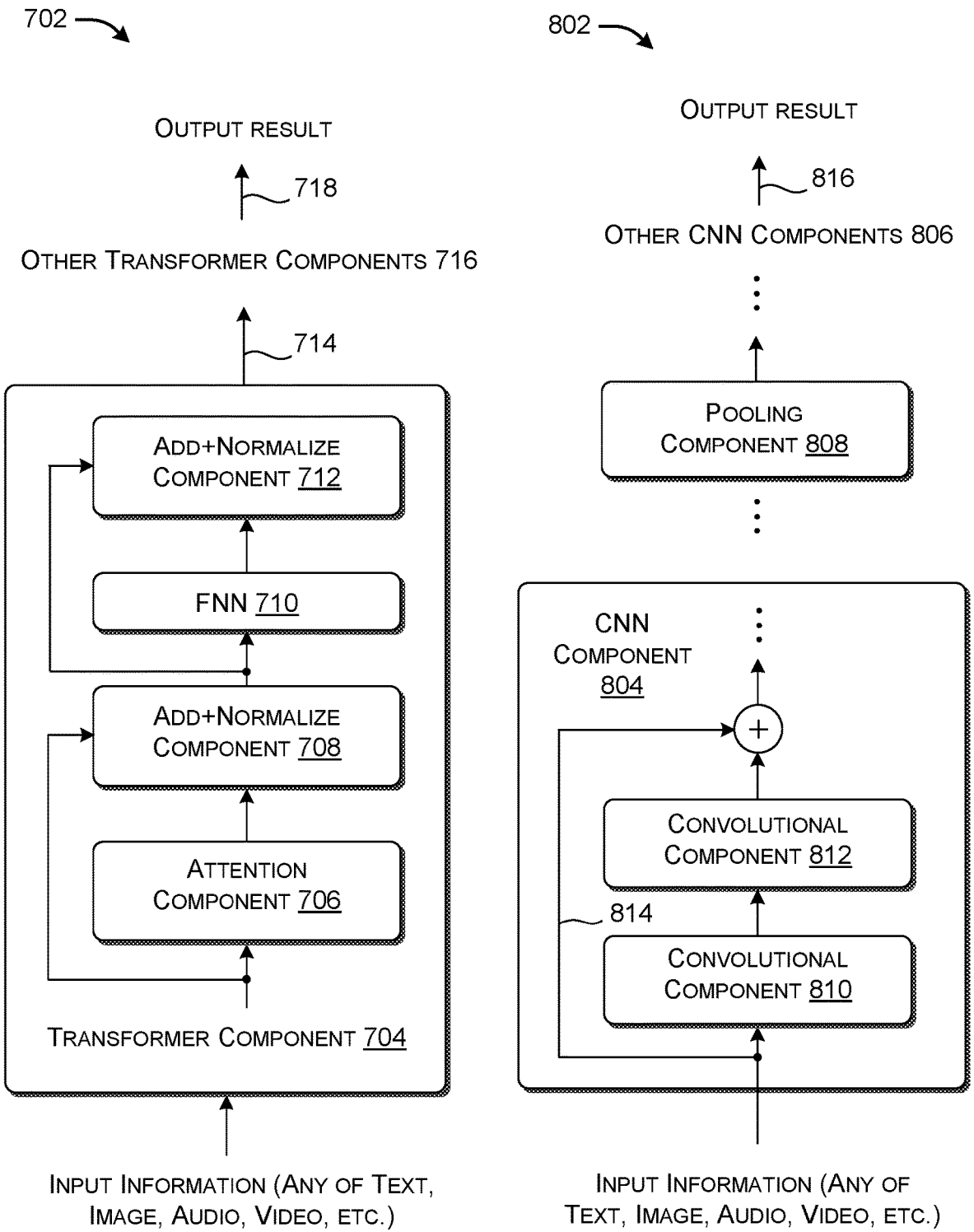
FIG. 7 shows a transformer-based machine-trained model for use in the computing system of FIG. 1.
FIG. 8 shows a convolutional neural network model for use in the computing system of FIG. 1.

FIG. 7 shows a transformer-based machine-trained transformer model 702 ("model" for brevity) that, in some implementations, is used to implement various parts of the computing system 102, including any part of the encoder system 104 and any part of the retrieval system 108. For example, with reference to the encoder system 104, the transformer model 702 can be used to implement various input-embedding subsystems, the first language-based encoding component 242, and the embedding conversion component 244. With respect to the retrieval system 108, the transformer model 702 can be used to implement the mapping component 308 and the language model 320.

The transformer model 702 receives a sequence of input vectors provided by any preceding component. For example, when used to implement the first language-based encoding component 242 of the encoder system 104, the transformer model 702 receives the input tokens that make up the input-system embedding 210. The transformer model 702 processes the sequence of input vectors using a pipeline of Z transformer components (or "blocks"), including a first transformer component 704. Each downstream transformer component operates on a sequence of input vectors produced by the preceding transformer component in the pipeline.

FIG. 7 provides details regarding one way to implement the first transformer component 704. Although not specifically illustrated, other transformer components of the transformer model 702 have the same architecture and perform the same functions as the first transformer component 704 (but are governed by separate sets of weights). In some implementations, the first transformer component 704 includes, in order, an attention component 706, a first add-and-normalize component 708, a feed-forward neural network (FFN) component 710, and a second add-and-normalize component 712.

The attention component 706 performs attention analysis using the following equation:

$$attn(Q, K, V) = \text{Softmax}\left(\frac{QK^T}{\sqrt{d}}\right)V. \quad (2)$$

The attention component 706 produces query information Q by multiplying the input vectors by a query weighting matrix $W^Q$. Similarly, the attention component 706 produces key information K and value information V by multiplying the position-supplemented embedding vectors by a key weighting matrix $W^K$ and a value weighting matrix $W^V$, respectively. To execute Equation (2), the attention component 706 takes the dot product of Q with the transpose of K, and then divides the dot product by a scaling factor vd, to produce a scaled result The symbol d represents the dimensionality of Q and K. The attention component 706 takes the Softmax (normalized exponential function) of the scaled result, and then multiplies the result of the Softmax operation by V, to produce attention output information. More generally stated, the attention component 706 determines how much emphasis should be placed on parts of the input information when interpreting other parts of the input information.

Although not shown in FIG. 7, the attention component 706 can be composed of plural attention heads. Each attention head performs the computations specified by Equation (2), but with respect to a particular representational subspace that is different than the subspaces of the other attention heads. To accomplish this operation, the attention heads perform the computations described above using different respective sets of query, key, and value weight matrices. Although not shown, the attention component 706 concatenates the output results of the attention component's separate attention heads, and then multiplies the results of this concatenation by another weight matrix $W^o$.

The add-and-normalize component 708 includes a residual connection that combines (e.g., sums) input information fed to the attention component 706 with the output information generated by the attention component 706. The add-and-normalize component 708 then normalizes the output information generated by of residual connection, e.g., by normalizing values in the output information based on the mean and standard deviation of those values. The other add-and-normalize component 712 performs the same functions as the first-mentioned add-and-normalize component 708. The FFN component 710 transforms input information to output information using a feed-forward neural network having any number of layers.

The first transformer component 704 produces an output embedding 714. A series of other transformer components 716 perform the same functions as the first transformer component 704, each operating on an output embedding produced by its immediately preceding transformer component. Each transformer component uses its own level-specific set of machine-trained weights. A final transformer component in the transformer model 702 produces a final output embedding 718.

In some implementations, a post-processing component (not shown) performs post-processing operations on the final output embedding 718. In one case, for instance, the post-processing component performs a machine-trained linear transformation on the final output embedding 718, and processes the result of this transformation using a Softmax component (not shown).

FIG. 8 shows an illustrative convolutional neural network (CNN) model 802. In some examples, a developer uses this type of CNN model 1502 to implement any input-embedding subsystem of the input-embedding system 206, such as the image encoder 218. Assume that the CNN model 802 operates on feature information that describes features in a data item having any data type, including a text item, an image item, an audio item, etc., or a combination thereof.

The CNN model 802 itself provides a pipeline that includes plural CNN components, such as CNN components (804, 806) optionally interspersed with pooling components, such as representative pooling component 808. FIG. 8 specifically shows the merely illustrative case in which the representative CNN component 804 includes a pair of convolutional components (810, 812). FIG. 8 also shows an optional residual connection 814 that adds input information fed to the first convolutional component 810 to output information produced by the second convolutional component 812.

Each convolutional component performs a convolution operation that involves moving a machine-trainable n×m kernel (e.g., a 3×3 kernel) across feature information supplied to the convolutional component. In the case of an input image, the feature information represents image information. In the case of an input text item, the feature information represents text information. At each position of the kernel, the convolutional component generates the dot product of the kernel values with the underlying values of the feature information. Each pooling component down-samples results of a preceding convolutional operation using some kind of sampling function, such as a maximum operation that selects a maximum value within a subset of values.

The CNN model 802 produces an output embedding 816 that corresponds to output information produced by the last CNN component 806. Alternatively, the CNN model 802 uses one or more additional neural network layers to process the output information produced by the last CNN component 806, which serves as an output embedding. For example, in some implementations, the CNN model 802 uses a fully-connected neural network to process the output information produced by the last CNN component 806.

Other implementations use other model architectures to implement any component of the computing system 102. These other architectures include recurrent neural networks (RNNs), other types of attention-based models, diffusions models, and so on.

F. Summary of the Operation of the Computing System

FIG. 9 shows a process 902 for creating an index (e.g., the retrieval index 106) for item retrieval. The following general information applies to all processes described in this Detailed Description, including the process 902. The process 902 is expressed as a series of operations performed in a particular order. But the order of these operations is merely representative, and the operations are capable of being varied in other implementations. Further, any two or more operations described below can be performed in a parallel manner. In one implementation, the blocks shown in the process 902 that pertain to processing-related functions are implemented by the hardware logic circuitry described in connection with FIGS. 11 and 12, which, in turn, is implemented by one or more processors, a computer-readable storage medium, etc.

In block 904, the encoder system 104 receives an input item, the input item having first content provided by a first input mode and second content provided by a second input mode, the second input mode differing from the first input mode. In block 906, the encoder system 104 maps, using an input-embedding system (e.g., the input-embedding system 206), the first content and the second content to an input-system embedding. In block 908, the encoder system 104 maps, using a language-based embedding-mapping system (e.g., the embedding-mapping system 208), the input-system embedding to a target item embedding that represents the input item. In block 910, the encoder system 104 stores the target item embedding in the index. The input-embedding system includes weights that are updated by a training system (e.g., the training system 134) during a training operation, and the language-based embedding-mapping system includes language model weights that are held fixed during the training operation.

Figure 10:
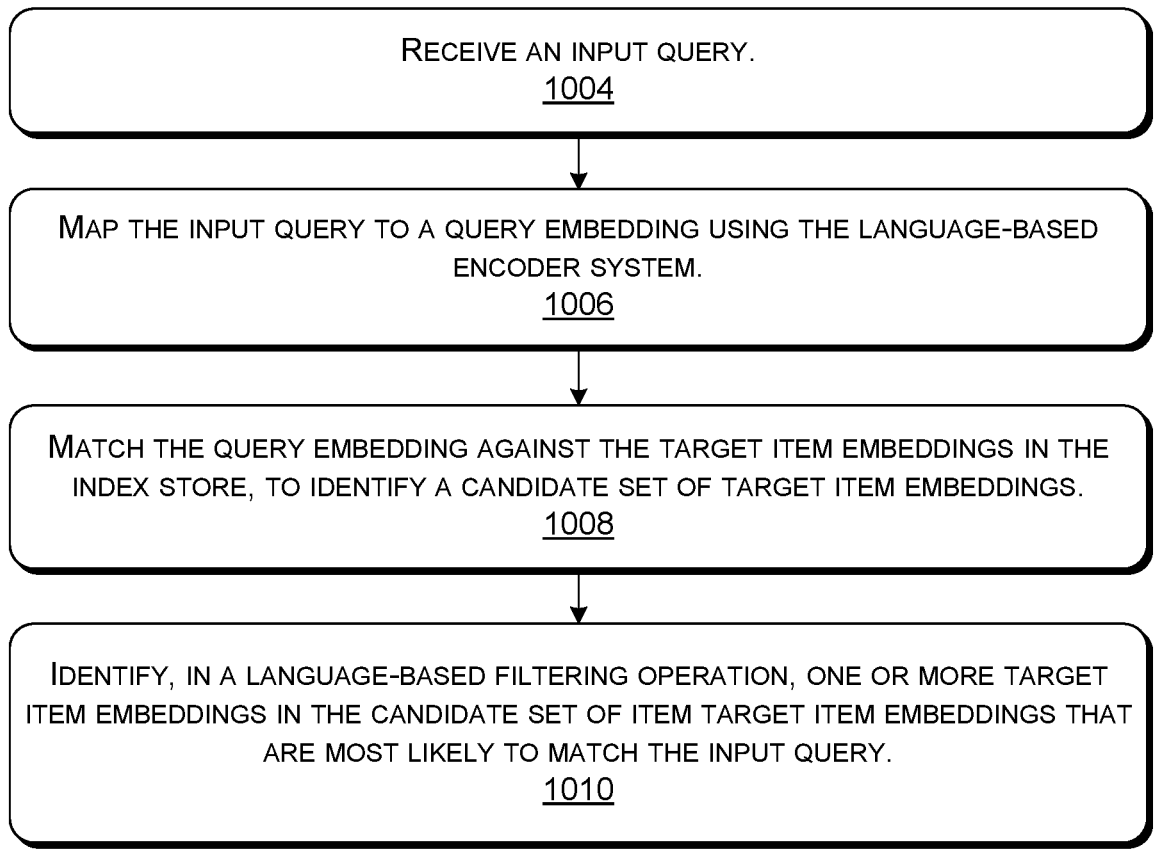
FIG. 10 shows a process that represents one manner of operation of the retrieval system of FIG. 3.

FIG. 10 shows a process 1002 for performing a retrieval operation. In block 1004, the retrieval system 108 receives an input query. In block 1006, the retrieval system 108 maps the input query to a query embedding using the language-based encoder system (e.g., the encoder system 104). In block 1008, the retrieval system 108 matches the query embedding against the target item embeddings in an index store (e.g., the index store 118), to identify a candidate set of target item embeddings. In block 1010, the retrieval system 108 identifies, in a language-based filtering operation, one or more target item embeddings in the candidate set of item target item embeddings that are most likely to match the input query. The language-based encoder system and the language-based filtering operation use language model weights that are held fixed during a training operation.

G. Illustrative Computing Equipment

FIG. 11 shows computing equipment 1102 that, in some implementations, is used to implement the computing system 102 of FIG. 1. The computing equipment 1102 includes a set of user devices 1104 coupled to a set of servers 1106 via a computer network 1108. Each user device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, a media device, a vehicle-borne computing system, any type of robot computing system, a computing system in a manufacturing system, etc. In some implementations, the computer network 1108 is implemented as a local area network, a wide area network (e.g., the Internet), one or more point-to-point links, or any combination thereof.

The dashed-line box in FIG. 11 indicates that the functionality of the computing system 102 is capable of being spread across the user devices 1104 and/or the servers 1106 in any manner. For instance, in some cases, each user device, or a group of affiliated user devices, implements the entirety the computing system 102. In other cases, the servers 1116 implement the entirety of the computing system 102; here, a developer or user may interact with the servers 1106 via a browser application provided by a user device. In other cases, the functionality of the computing system 102 is shared between each user device and the servers 1106.

FIG. 12 shows a computing system 1202 that, in some implementations, is used to implement any aspect of the mechanisms set forth in the above-described figures. For instance, in some implementations, the type of computing system 1202 shown in FIG. 12 is used to implement any user device or any server shown in FIG. 11. In all cases, the computing system 1202 represents a physical and tangible processing mechanism.

The computing system 1202 includes a processing system 1204 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1202 also includes computer-readable media 1206, corresponding to one or more computer-readable media hardware units. The computer-readable media 1206 retains any kind of information 1208, such as machine-readable instructions, settings, model weights, and/or other data. In some implementations, the computer-readable media 1206 includes one or more solid-state devices, one or more magnetic hard disks, one or more optical disks, magnetic tape, etc. Any instance of the computer-readable media 1206 uses any technology for storing and retrieving information. Further, any instance of the computer-readable media 1206 represents a fixed or removable unit of the computing system 1202. Further, any instance of the computer-readable media 1206 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1202 utilizes any instance of the computer-readable storage media 1206 in different ways. For example, in some implementations, any instance of the computer-readable storage media 1206 represents a hardware memory unit (such as random access memory (RAM)) for storing information during execution of a program by the computing system 1202, and/or a hardware storage unit (such as a hard disk) for retaining/archiving information on a more permanent basis. In the latter case, the computing system 1202 also includes one or more drive mechanisms 1210 (such as a hard drive mechanism) for storing and retrieving information from an instance of the computer-readable storage media 1206.

In some implementations, the computing system 1202 performs any of the functions described above when the processing system 1204 executes computer-readable instructions stored in any instance of the computer-readable storage media 1206. For instance, in some implementations, the computing system 1202 carries out computer-readable instructions to perform each block of the processes described in with reference to FIGS. 9 and 10. FIG. 12 generally indicates that hardware logic circuitry 1212 includes any combination of the processing system 1204 and the computer-readable storage media 1206.

In addition, or alternatively, the processing system 1204 includes one or more other configurable logic units that perform operations using a collection of logic gates. For instance, in some implementations, the processing system 1204 includes a fixed configuration of hardware logic gates, e.g., that are created and set at the time of manufacture, and thereafter unalterable. In addition, or alternatively, the processing system 1204 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1204 effectively incorporates a storage device that stores computer-readable instructions, insofar as the configurable logic units are configured to execute the instructions and therefore embody or store these instructions.

In some cases (e.g., in the case in which the computing system 1202 represents a user computing device), the computing system 1202 also includes an input/output interface 1214 for receiving various inputs (via input devices 1216), and for providing various outputs (via output devices 1218). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1220 and an associated graphical user interface presentation (GUI) 1222. The display device 1220 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1202 also includes one or more network interfaces 1224 for exchanging data with other devices via one or more communication conduits 1226. One or more communication buses 1228 communicatively couple the above-described units together.

The communication conduits 1226 are capable of being implemented in any manner, e.g., by a local area computer network, a wide area computer network (e.g., the Internet), point-to-point connections, or any combination thereof. The communication conduits 1226 include any combination of hardwired links, wireless links, routers, gateway functionality, name servers, etc., governed by any protocol or combination of protocols.

FIG. 12 shows the computing system 1202 as being composed of a discrete collection of separate units. In some cases, the collection of units corresponds to discrete hardware units provided in a computing device chassis having any form factor. FIG. 12 shows illustrative form factors in its bottom portion. In other cases, the computing system 1202 includes a hardware logic unit that integrates the functions of two or more of the units shown in FIG. 1. For instance, in some implementations, the computing system 1202 includes a system on a chip (SoC or SOC), corresponding to an integrated circuit that combines the functions of two or more of the units shown in FIG. 12.

The following summary provides a set of illustrative examples of the technology set forth herein.

(A1) According to a first aspect, a method (e.g., the process 902) is described for creating an index (e.g., the index 106) for item retrieval. The method includes: receiving (e.g., in block 904) an input item, the input item having first content provided by a first input mode and second content provided by a second input mode, the second input mode differing from the first input mode; mapping (e.g., in block 906), using an input-embedding system (e.g., the input-embedding system 206), the first content and the second content to an input-system embedding; mapping (e.g., in block 908), using a language-based embedding-mapping system (e.g., the language-based embedding-mapping system 208), the input-system embedding to a target item embedding that represents the input item; and storing (e.g., in block 910) the target item embedding in the index. The input-embedding system includes weights that are updated by a training system (e.g., the training system 134) during a training operation, and the language-based embedding-mapping system includes language model weights that are held fixed during the training operation.

(A2) According to some implementations of the method of A1, the target item embedding in the index represents a particular target concept. Plural expressions of the target concept, that have been generated using different input modes and different combinations of input modes, map to the same target item embedding.

(A3) According to some implementations of the methods of A1 or A2, the first input mode and the second input mode are any two different input modes selected from a group that includes: a text input mode, an image input mode, an audio input mode, and a video input mode.

(A4) According to some implementations of any individual method of methods of A1-A3, the input item has third content provided by a third input mode that differs from the first input mode and the second input mode.

(A5) According to some implementations of any individual method of methods of A1-A4, the input-embedding system includes a first input-embedding subsystem and a second input-embedding subsystem. The method further includes: mapping, using the first input-embedding subsystem, the first content to a first input embedding; and mapping, using the second input-embedding subsystem, the second content to a second input embedding. The input-system embedding includes the first input embedding and the second input embedding, and at least one of the input-embedding subsystems includes weights that are updated by the training system during the training operation.

(A6) According to some implementations of any individual method of methods of A1-A5, the language-based embedding-mapping system operates by: mapping, using a language-based encoding operation, the input-system embedding to a first-stage embedding; and mapping, using an embedding conversion operation, the first-stage embedding to the target item embedding, in a vector space of the index. The embedding conversion operation uses weights that are updated by the training system during the training operation, and the language-based encoding operation uses language model weights that are held fixed during the training operation.

(A7) According to some implementations of any individual method of methods of A1-A6, the method further includes: assessing a processing capability of an execution platform; and setting an amount of processing operations to be performed by the language-based encoder system based on the processing capability.

(A8) According to some implementations of any individual method of methods of A1-A7, the method further includes, in retrieval operation: receiving an input query; mapping the input query to a query embedding using the input-embedding system and the language-based embedding-mapping system; and finding a candidate set of target item embeddings in the index that match the query embedding.

(A9) According to some implementations of the method of A8, the method further includes, in a language-based filtering operation, identifying one or more target item embeddings in the candidate set of target items embeddings that are most likely to match the input query.

(A10) According to some implementations of the method of A9, the language-based filtering operation includes: receiving prompt information; and mapping, in a language-based encoding operation, the prompt information, the query embedding, and the candidate set of target item embeddings to output results, the output results identifying the one or more target item embeddings that are most likely to match the input query. The language-based encoding operation uses language model weights that are held fixed during the training operation.

(A11) According to some implementations of the method of A10, the method further includes: mapping, in a preliminary mapping operation prior to the language-based encoding operation, the candidate set of target item embeddings to a transformed set target item embeddings in a vector space of the language-based encoding operation. The preliminary mapping operation uses weights that are updated during the training operation.

(A12) According to some implementations of any individual method of the methods of A9-A11, the language-based encoder system and/or the language-based filtering operation use transformer-based machine-trained logic.

(B1) According to a second aspect, a method (e.g., the process 1002) is described for performing a retrieval operation. The method includes: receiving (e.g., in block 1004) an input query; mapping (e.g., in block 1006) the input query to a query embedding using a language-based encoder system (e.g., the encoder system 104); matching (e.g., in block 1008) the query embedding against the target item embeddings in an index store (e.g., the index store 118), to identify a candidate set of target item embeddings; and identifying (e.g., in block 1010), in a language-based filtering operation, one or more target item embeddings in the candidate set of item target item embeddings that are most likely to match the input query. The language-based encoder system and the language-based filtering operation use language model weights that are held fixed during a training operation.

(B2) According to some implementations of the method of B1, the language-based filtering operation includes: receiving prompt information; and mapping, in a language-based encoding operation, the query embedding, the prompt information, and the candidate set of target item embeddings to output results, the output results identifying the one or more target item embeddings that are most likely to match the input query. The language-based encoding operation uses language model weights that are held fixed during the training operation.

(B3) According to some implementations of the method of B2, the operations further include: mapping, in a preliminary mapping operation prior to the language-based encoding operation, the candidate set of target item embeddings to a transformed set target item embeddings in a vector space of the language-based encoding operation. The preliminary mapping operation uses weights that are updated during the training operation.

In yet another aspect, some implementations of the technology described herein include a computing system (e.g., the computing system 1202) that includes a processing system (e.g., the processing system 1204). The computing system also includes a storage device (e.g., the computer-readable storage media 1206) for storing computer-readable instructions (e.g., information 1208). The processing system executes the computer-readable instructions to perform any of the methods described herein (e.g., any individual method of the methods of A1-A13).

In yet another aspect, some implementations of the technology described herein include a computer-readable storage medium (e.g., the computer-readable storage media 1206) for storing computer-readable instructions (e.g., the information 1208). A processing system (e.g., the processing system 1204) executes the computer-readable instructions to perform any of the operations described herein (e.g., the operation in any individual method of the methods of A1-A13).

More generally stated, any of the individual elements and steps described herein are combinable into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1212 of FIG. 12. The term "logic" likewise encompasses various physical and tangible mechanisms for performing a task. For instance, each processing-related operation illustrated in the flowcharts of FIGS. 9 and 10 corresponds to a logic component for performing that operation.

This description may have identified one or more features as optional. This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for creating an index for item retrieval, comprising:
   receiving an input item, the input item having first content provided by a first input mode and second content provided by a second input mode, the second input mode differing from the first input mode;

mapping, using an input-embedding system, the first content and the second content to an input-system embedding, wherein the input-embedding system has a plurality of input-embedding subsystems having respective machine-trained models for processing input items having different types of content provided by different respective input modes, the different types of content including text content and non-text content, and wherein the input-embedding system has weights iteratively produced by a training system, after a first phase of training, in a second phase of training;

mapping, using a language-based embedding-mapping system, the input-system embedding to a particular target item embedding that represents the input item, wherein the language-based embedding-mapping system has language model weights that are iteratively produced in the first phase of training before the second phase of training, wherein the second phase of training that iteratively produces the weights of the input-embedding system includes mapping performed by the language-based embedding-mapping system, and wherein the language model weights iteratively produced in the first phase of training are held fixed during the second phase of training; and storing the particular target item embedding in the index, wherein the input-embedding system and the language-based embedding-mapping system comprise a language-based encoder system having a series of processing blocks, and wherein the method further comprises:

at a first time, assessing that an execution platform has a first processing capability;

instructing the language-based encoder system to generate a provisional target item embedding using a first number of processing blocks in the series of processing blocks that is less than all of the processing blocks in the series of processing blocks;

storing the provisional target item embedding;

at a second time after the first time, assessing that the execution platform has a second processing capability that is greater than the first processing capability; and instructing the language-based encoder system to continue processing the provisional target item embedding using remaining blocks in the series of processing blocks that were not included in the first number of processing blocks, to produce a final target item embedding, wherein the particular item embedding is the provisional target embedding or the final target item embedding.

2. The method of claim 1, wherein the particular target item embedding in the index represents a particular target concept, and wherein plural expressions of the target concept, that have been generated using the different input modes and different combinations of the input modes, map to the same particular target item embedding.

3. The method of claim 1, wherein the first input mode and the second input mode are any two different input modes selected from a text input mode, an image input mode, an audio input mode, or a video input mode.

4. The method of claim 1, wherein the plurality of input-embedding subsystems of the input-embedding system include a first input-embedding subsystem and a second input-embedding subsystem, wherein the first input-embedding subsystem includes weights that are iteratively produced by the training system during the second phase of training, and wherein the method includes:

mapping, using the first input-embedding subsystem, the first content to a first input embedding; and mapping, using the second input-embedding subsystem, the second content to a second input embedding, wherein the input-system embedding includes the first input embedding and the second input embedding.

5. The method of claim 1, wherein the language-based embedding-mapping system operates by:

mapping, using a language-based encoding operation, the input-system embedding to a first-stage embedding; and mapping, using an embedding conversion operation, the first-stage embedding to the particular target item embedding, in a vector space of the index, wherein the embedding conversion operation uses weights that are iteratively produced by the training system during a third phase of training after the second phase of training, and the language-based encoding operation uses language model weights that are iteratively produced in the first phase of training and are held fixed during the third stage of training.

6. The method of claim 1, further comprising, in a retrieval operation:

receiving an input query;

mapping the input query to a query embedding using the input-embedding system and the language-based embedding-mapping system; and finding a candidate set of target item embeddings in the index that match the query embedding, and further comprising, in a language-based filtering operation:

receiving prompt information that describes a filtering task; and mapping, in a language-based encoding operation, the prompt information, the query embedding, and the candidate set of target item embeddings to output results, the output results identifying one or more target item embeddings of the candidate set of target item embeddings that are most likely to match the input query, wherein the language-based encoding operation uses language model weights that are iteratively produced in the first phase of training.

7. The method of claim 6, further comprising:

mapping, in a preliminary mapping operation prior to the language-based encoding operation, the candidate set of target item embeddings to a transformed set of target item embeddings in a vector space of the language-based encoding operation, wherein the preliminary mapping operation uses weights that are iteratively produced during a subsequent phase of training after the second phase of training, and wherein the language model weights of the language-based encoding operation are held fixed during the subsequent phase of training.

8. The method of claim 6, wherein the input-embedding system and the language-based embedding-mapping system comprise a language-based encoder system, and wherein the language-based encoder system and/or the language-based filtering operation use transformer-based machine-trained logic.

9. A computing system for creating an index for item retrieval, comprising:

an instruction store for storing computer-readable instructions;
a processing system for executing the computer-readable instructions to perform operations that include:
receiving an input item having content;
mapping, using an input-embedding system, the content to an input-system embedding, wherein the input-embedding system includes a plurality of input-embedding subsystems having respective machine-trained models for processing input items having different types of content provided by different respective input modes, the different types of content including text content and non-text content, and wherein the input-embedding system has weights iteratively produced by a training system, after a first phase of training, in a second phase of training;
mapping, using a language-based embedding-mapping system, the input-system embedding to a particular target item embedding that represents the input item, wherein the language-based embedding-mapping system has language model weights that are iteratively produced in the first phase of training before the second phase of training, and wherein the second phase of training that iteratively produces the weights of the input-embedding system includes mapping performed by the language-based embedding-mapping system, and wherein the language model weights iteratively produced in the first phase of training are held fixed during the second phase of training; and
storing the particular target item embedding in the index, wherein a query that expresses a same target concept as the input item maps to a same target item embedding, regardless of a type of content used to express the query, including text context and non-text content,
wherein the input-embedding system and the language-based embedding-mapping system comprise a language-based encoder system having a series of processing blocks, and wherein and the operations further comprise:
at a first time, assessing that an execution platform has a first processing capability;
instructing the language-based encoder system to generate a provisional target item embedding using a first number of processing blocks in the series of processing blocks that is less than all of the processing blocks in the series of processing blocks;
storing the provisional target item embedding;
at a second time after the first time, assessing that the execution platform has a second processing capability that is greater than the first processing capability; and
instructing the language-based encoder system to continue processing the provisional target item embedding using remaining blocks in the series of processing blocks that were not included in the first number of processing blocks, to produce a final target item embedding,
wherein the particular item embedding is the provisional target embedding or the final target item embedding.

10. The computing system of claim 9, wherein the plurality of input-embedding subsystems include:
a first input-embedding subsystem for mapping first content provided by a first input mode to a first input embedding, the first content being non-text content; and
a second input-embedding subsystem for mapping second content provided by a second input mode to a second input embedding, the second input mode differing from the first input mode and the second content being text content, wherein the first input-embedding subsystem includes weights that are iteratively produced by the training system during the second phase of training.

11. The computing system of claim 10, wherein the second input-embedding system includes weights that are iteratively produced in the first phase of training and are held fixed by the training system during the second phase of training.

12. The computing system of claim 9, wherein the input item is produced using a single input mode and includes a single type of content.

13. The computing system of claim 9, wherein the input item is produced using two or more input modes, and includes plural types of content.

14. The computing system of claim 9, wherein the language-based embedding-mapping system operates by:
mapping, using a language-based encoding operation, the input-system embedding to a first-stage embedding, wherein the language-based encoding operation uses language model weights that are iteratively produced in the first phase of training; and
mapping, using an embedding conversion operation, the first-stage embedding to the particular target item embedding, in a vector space of the index, wherein the embedding conversion operation uses weights that are iteratively produced by the training system during a third stage of training after the second phase of training, while holding the language model weights used in the language-based encoding operation fixed.

15. A computer-readable storage medium for storing computer-readable instructions, a processing system executing the computer-readable instructions to perform operations, the operations comprising:
receiving an input item having content;
mapping, using an input-embedding system, the content to an input-system embedding,
the input-embedding system including a first input-embedding subsystem for mapping first content provided by a first input mode to a first input embedding, and a second input-embedding subsystem for mapping second content provided by a second input mode to a second input embedding, the second input mode differing from the first input mode, wherein the first input-embedding subsystem and the second input-embedding subsystem use respective machine-trained models, wherein the first input-embedding subsystem includes weights that are iteratively produced by a training system, after a first phase of training, in a second phase of training, and wherein the first content is image content and the second content is text content;
mapping, using a language-based embedding-mapping system, the input-system embedding to a target item embedding that represents the input item, wherein the second input-embedding subsystem and the language-based embedding-mapping system have language model weights that are iteratively produced in the first phase of training before the second phase of training, and wherein the second phase of training that iteratively produces weights of the first input-embedding subsystem includes mapping performed by the language-based embedding-mapping system, and wherein the weights of the second input-embedding subsystem and the language-based embedding-mapping system are held fixed during the second phase of training; and storing the target item embedding in an index for item retrieval, further comprising, in a retrieval operation:

receiving an input query;

mapping the input query to a query embedding using the input-embedding system and the language-based embedding-mapping system; and finding a candidate set of target item embeddings in the index that match the query embedding, and further comprising, in a language-based filtering operation:

receiving prompt information that describes a filtering task; and mapping, in a language-based encoding operation, the prompt information, the query embedding, and the candidate set of target item embeddings to output results, the output results identifying one or more target item embeddings of the candidate set of target item embeddings that are most likely to match the input query, wherein the language-based encoding operation uses language model weights that are iteratively produced in the first phase of training.

16. The computer-readable storage medium of claim 15, wherein the language-based embedding-mapping system operates by:

mapping, using another language-based encoding operation, the input-system embedding to a first-stage embedding, wherein said another language-based encoding operation uses language model weights that are iteratively produced in the first phase of training; and mapping, using an embedding conversion operation, the first-stage embedding to the target item embedding, in a vector space of the index, wherein the embedding conversion operation uses weights that are iteratively produced by the training system during a third stage of training after the second stage of training, while holding the language model weights used in said another language-based encoding operation fixed.

17. The method of claim 1, wherein the input-embedding system includes a first input-embedding subsystem for mapping image content to a first input embedding, and a second input-embedding subsystem for mapping text content to a second input embedding, wherein the second input-embedding subsystem includes weights that are iteratively produced in the first phase of training, and wherein the first input-embedding subsystem includes weights that are iteratively produced in the second phase of training while the weights of the second input-embedding system are held fixed.

18. The computer-readable storage medium of claim 15, wherein the input-embedding system and the language-based embedding-mapping system comprise a language-based encoder system having a series of processing blocks, and further comprising:

assessing a processing capability of an execution platform that depends on a hardware capability of the execution platform and/or a current operational state of the execution platform; and setting a number of the processing blocks to be invoked by the language-based encoder system in a course of generating the target item embedding based on the processing capability, the number of processing blocks being less than all of the processing blocks in the series of processing blocks, wherein the language-based encoder system generates the target item embedding using the number of processing blocks.

* * * * *